United States Patent [19]
Itoh

[11] Patent Number: 6,132,047
[45] Date of Patent: Oct. 17, 2000

[54] POLARIZED LIGHT ILLUMINATION DEVICE AND PROJECTOR

[75] Inventor: Yoshitaka Itoh, Suwa, Japan

[73] Assignee: Seiko Epson Corporation, Nagano-Ken, Japan

[21] Appl. No.: 09/373,206

[22] Filed: Aug. 12, 1999

Related U.S. Application Data

[63] Continuation-in-part of application No. 09/251,346, Feb. 17, 1999.

[30] Foreign Application Priority Data

Feb. 18, 1998 [JP] Japan .................................. 10-36481

[51] Int. Cl.$^7$ .......................... G03B 21/14; G03D 21/00; G02F 1/1335
[52] U.S. Cl. .................................. 353/20; 353/8; 353/31; 353/94; 349/9
[58] Field of Search .......................... 355/71, 32; 353/8, 353/20, 94, 31, 33, 34, 37; 349/9, 8, 68

[56] References Cited

U.S. PATENT DOCUMENTS

| | | |
|---|---|---|
| 5,295,017 | 3/1994 | Konuma et al. . |
| 5,446,510 | 8/1995 | Mitsutake et al. ........................ 353/20 |
| 5,765,934 | 6/1998 | Okamori et al. .......................... 353/94 |

FOREIGN PATENT DOCUMENTS

| | | |
|---|---|---|
| 0 753 780 | 1/1997 | European Pat. Off. . |
| 0 857986 | 8/1998 | European Pat. Off. . |
| 8-029734 | 2/1966 | Japan . |
| 7-244282 | 9/1995 | Japan . |
| 8-211329 | 8/1996 | Japan . |
| 8-220475 | 8/1996 | Japan . |
| 11-030767 | 2/1999 | Japan . |
| 11-095171 | 4/1999 | Japan . |

Primary Examiner—Russell Adams
Assistant Examiner—Khaled Brown
Attorney, Agent, or Firm—Oliff & Berridge, PLC

[57] ABSTRACT

In a polarized light illumination apparatus, randomly polarized lights emitted from first and second light sources are respectively separated by a polarized light separating optical element into two different types of polarized light thereby producing three types of polarized light which are polarized in directions perpendicular to one another. The polarized lights are partially returned to the light sources and their polarization directions are rotated. Secondary light source images are formed at locations shifted in an x direction whereby polarization is aligned in the same single direction. Thus, even though a plurality of light sources are used, the polarized light illumination apparatus can emit illumination light using both polarized components without causing an increase in the illumination angle. Furthermore, a projector capable of projecting an image with a very high brightness can be realized.

22 Claims, 15 Drawing Sheets

POLARIZED LIGHT ILLUMINATION DEVICE AND PROJECTOR

This is a Continuation-in-Part of application Ser. No. 09/251,346 filed Feb. 17, 1999. The entire disclosure of the prior application is hereby incorporated by reference herein in its entirety.

BACKGROUND OF THE INVENTION

1. Field of the Invention

The present invention relates to a polarized light illumination apparatus for uniformly illuminating a rectangular illumination area with light polarized in the same direction, and also to a projector using such a polarized light illumination apparatus. More particularly, the present invention relates to a structure for synthesizing lights emitted from two light sources such that the resultant synthesized light is polarized in the same direction.

2. Description of Related Art

In liquid crystal display devices using a modulating element such as a liquid crystal element which modulates light polarized in a particular direction, only one component of two different polarized light components included in light emitted from a light source is used. To obtain a projected image with high brightness, it is required to increase the utilization efficiency of light.

However, when a projector is constructed using a single light source, the utilization efficiency of light has a practical upper limit. Thus, one technique of projecting a high-brightness image is to increase the amount of light using a plurality of light sources.

However, if a plurality of light sources are arranged in a simple fashion, the overall area of the light source image becomes greater by a factor corresponding to the number of light sources. As a result, the angle of light (illumination angle) striking an illumination area also increases by a corresponding factor. This means that the amount of light per unit area is the same as that obtained with a single light source. In other words, the amount of light per unit area cannot be increased by using a plurality of light sources arranged in the above-described fashion.

Even when the amount of light can be increased by using a plurality of light sources, if only one component of two polarized light components of light emitted from the light sources is used, one-half of the total amount of light is wasted.

SUMMARY OF THE INVENTION

It is an object of the present invention to provide a polarized light illumination apparatus including a plurality of light sources and capable of emitting light using both polarized light components without causing an increase in the illumination angle. It is another object of the present invention to provide a projector capable of forming a projected image with extremely high brightness.

According to an aspect of the present invention, there is provided a polarized light illumination apparatus comprising:

a polarized light separating optical element including a first polarization separating film for separating light incident from a first direction into two types of polarized light, transmitting one of the two types of polarized light and directing it in a third direction, and reflecting another of the two types of polarized light and directing it in a fourth direction, and also including a second polarization separating film for separating light incident from a second direction into two types of polarized light, reflecting one of the two types of polarized light and directing it in the fourth direction, and transmitting another of the two types of polarized light and directing it in a fifth direction;

a first light source for emitting the light incident on the polarized light separating optical element from the first direction;

a second light source for emitting the light incident on the polarized light separating optical element from the second direction;

a first condensing and reflecting optical element including a plurality of small condensing and reflecting elements for substantially reversing the traveling direction of the light emerging from the polarized light separating optical element in the third direction and forming a plurality of condensed light images;

a second condensing and reflecting optical element including a plurality of small condensing and reflecting elements for substantially reversing the traveling direction of the light emerging in the fifth direction from the polarized light separating optical element and forming a plurality of condensed light images;

a reflecting optical element for substantially reversing the traveling direction of the light emerging in the fourth direction from the polarized light separating optical element;

a first polarization-state conversion optical element disposed between the polarized light separating optical element and the first condensing and reflecting optical element;

a second polarization-state conversion optical element disposed between the polarized light separating optical element and the second condensing and reflecting optical element;

a third polarization-state conversion optical element disposed between the polarized light separating optical element and the reflecting optical element; and a polarization conversion optical element for making uniform the direction of polarization of the light emerging from the polarized light separating optical element in a sixth direction; the polarized light illumination apparatus being characterized in that:

the center axis of the light which is incident on the polarization conversion optical element after being reflected by the small condensing and reflecting elements of the first condensing and reflecting optical element and the center axis of the light which is incident on the polarization conversion optical element after being reflected by the small condensing and reflecting elements of the second condensing and reflecting optical element are substantially parallel to each other and do not overlap each other.

In this polarized light illumination apparatus according to the present invention, randomly polarized light emitted from the first light source is incident on the polarized light separating optical element from the first direction. The first polarization separating film separates the randomly polarized light into two types of polarized light. Similarly, randomly polarized light emitted from the second light source is incident on the polarized light separating optical element from the second direction. The second polarization separating film separates the randomly polarized light into two types of polarized light.

Of the polarized lights separated via the above-described process, the polarized light transmitted through the first polarization separating film and emerging in the third direction passes through the first polarization-state conversion optical element and then reflected by the first small condensing and reflecting optical elements. The resultant light again passes through the first polarization-state conversion optical element and is directed to the polarized light separating optical element. In the above process, the light is separated by the first small condensing and reflecting optical elements into a plurality of intermediate lights. Furthermore, when the lights passes through the first polarization-state conversion optical element twice, the polarization axis is rotated by substantially 90°. Thus, the resultant light is reflected by the first polarization separating film and directed in the sixth direction. Herein, the polarized light directed in the sixth direction via the above-described process is referred to as first polarized light.

On the other hand, the polarized light transmitted through the second polarization separating film and emitted in the fifth direction passes through the second polarization-state conversion optical element and then reflected by the second condensing and reflecting optical element. The resultant light again passes through the second polarization-state conversion optical element and is directed to the polarized light separating optical element. In the above process, the light is separated by the second small condensing and reflecting optical elements into a plurality of intermediate lights. Furthermore, when the lights passes through the second polarization-state conversion optical element twice, the polarization axis is rotated by substantially 90°. Thus, the resultant light is reflected by the second polarization separating film and directed in the sixth direction. Herein, the polarized light directed in the sixth direction via the above-described process is referred to as second polarized light.

The center axes of the first and second polarized lights directed in the sixth direction are substantially parallel to each other and they do not overlap each other. As a result, the condensed light image of the first polarized light and the condensed light image of the second polarized light are formed at locations different from each other. Thus, the polarization axis of the first polarized light and the polarization axis of the second polarized light are aligned by the polarization conversion optical element into the same direction.

On the other hand, the polarized lights reflected by the first and second polarization separating films, respectively, and directed in the fourth direction pass through the third polarization-state conversion optical element and then reflected by the third reflecting optical element. The resultant lights again pass through the third polarization-state conversion optical element and directed to the polarized light separating optical element. When the lights pass through the third polarization-state conversion optical element twice, their polarization axis is rotated by substantially 90°. Thus, the light, emitted from the first light source, reflected by the first polarization separating film, and returned to the polarized light separating optical element via the third polarization-state conversion optical element and the third reflecting optical element, is reflected by the second polarization separating film and directed to the second light source. On the other hand, the light, emitted from the second light source, reflected by the second polarization separating film, and returned to the polarized light separating optical element via the third polarization-state conversion optical element and the third reflecting optical element, is reflected by the first polarization separating film and directed to the first light source. As a result, these lights are incident on the light sources which are different from the light sources from which they originate. The light sources used in the projector usually include a light source lamp and a reflector. Thus, the lights incident on the light sources are reflected by their reflector. When the light are reflected, the polarization axis is rotated. As a result, a part of each light is converted to a polarized light capable of passing through the first or second polarization separating film. The lights which became capable of passing through the first or second polarization separating film are converted to first polarized light and second light in a similar manner as the above-described polarized lights directed in the third and fifth directions and incident on the polarization conversion optical element. The polarization axes of these lights are aligned by the polarization conversion optical element into the same direction. Thus, the polarized lights directed from the polarized light separating optical element to the first and second light sources are eventually converted into the single type polarized light.

Therefore, even though two light sources are used, the lights emitted from the two light sources can strike the same area as that illuminated with light emitted from a single light source without causing an increase in the incident angle (illumination angle) of the illumination light to the illumination area. This means that the amount of light per unit area can be increased to a level approximately twice greater than can be obtained with a single light source. This makes it possible to illuminate the illumination area very brightly. By superimposing intermediate lights separated by the respective condensing and reflective optical elements into a single light striking a single location in the illumination area, it becomes possible to uniformly illuminate the illumination area. Therefore, if the polarized light illumination apparatus according to the present invention is used as a light source of a display device, an image with very uniform brightness can be obtained. Furthermore, in the polarized light illumination apparatus according to the present invention, the randomly polarized lights emitted from the first and second light sources can be synthesized into a single type polarized light without causing substantially any loss. Therefore, if the polarized light illumination apparatus is employed in a display device including a modulator such as a liquid crystal device for modulating light polarized in a particular direction, a very bright image can be obtained. Furthermore, the center axis of the light which is incident on the polarization conversion optical element after being reflected by the small condensing and reflecting elements of the first condensing and reflecting optical element and the center axis of the light which is incident on the polarization conversion optical element after being reflected by the small condensing and reflecting elements of the second condensing and reflecting optical element are substantially parallel to each other. This means that lights reflected by the small condensing and reflecting elements of the first and second condensing and reflecting optical elements are incident at substantially the same angle upon the polarized light separating optical element. Therefore, even when the polarized light separation characteristic of the polarized light separating optical element is sensitive to the incident angle of light, polarized light separation can be accomplished in a highly reliable fashion and thus a uniform illumination light can be obtained.

Although the first and second condensing and reflecting optical elements are not limited to specific locations, it is required that the first and second condensing and reflecting optical elements be disposed so that the secondary light source images of two polarized light components (immediately after they are emitted from the first and second light sources, they are polarized in directions which allow themselves to pass through the first and second polarization separating films) contained in the lights emitted from the first and second light sources are formed at spatially different locations.

In the present invention, the reflecting optical element is preferably disposed such that the polarized light emitted from the first light source and then reflected by the first polarization separating film and the polarized light emitted from the second light source and then reflected by the second polarization separating film are incident on the light sources different from those from which the polarized lights originate. In particular when the optical axis of the first light source and the optical axis of the second light source are perpendicular to each other and the polarized light separating optical element is formed in a rectangular parallelepiped shape, it is desirable that the reflecting optical element be disposed parallel to the surface, facing in the fourth direction, of the polarized light separating optical element. Thus, the polarized light which is emitted from the first light source and reflected by the second polarization separating film via the first polarization separating film and the reflecting optical element can be incident on the second light source in a highly efficient manner, and the polarized light which is emitted from the second light source and reflected by the first polarization separating film via the second polarization separating film and the reflecting optical element can be incident on the first light source in a highly efficient manner. That is, the efficiency in use of polarized light is improved, and thus it becomes possible to brightly illuminate the illumination area.

In the present invention, the shape of the opening of each small condensing and reflecting element may be geometrically similar to the shape of an area to be illuminated. The lights emitted from the light sources are divided by the condensing and reflecting optical elements into a plurality of lights and, eventually, superimposed upon one another in the illumination area. Thus, it becomes possible to direct the lights emitted from the light sources to the illumination area without producing a loss.

In the present invention, a condensing optical element including a plurality of condensing elements for condensing the light emerging from the polarized light separating optical element may be disposed on the incident side or the emitting side of the polarization conversion optical element so that the intermediate lights produced by the condensing and reflecting optical elements are condensed and directed to particular locations of the polarization conversion optical element thereby achieving a high efficiency in polarization conversion performed by the polarization conversion optical element. In the case where the number of small condensing and reflecting elements of the first condensing and reflecting optical element is different from that of the second condensing and reflecting optical element, the number of small condensing elements of the condensing optical element is preferably set to be twice the number of small condensing and reflecting elements of the condensing and reflecting optical element having the greatest number of small condensing and reflecting elements. However, if the optical characteristics of the condensing optical element are properly adjusted, the number of small condensing elements of the condensing optical element may be equal to the number of small condensing and reflecting elements of the condensing and reflecting optical element. In the present invention, a superimposing optical element for superimposing the lights emerging from the polarization conversion optical element upon one another in the illumination area may be disposed on the emitting side of the polarization conversion optical element. The superimposing optical element allows the intermediate lights produced by the condensing and reflecting optical elements to reach the illumination area in an effective fashion, thereby allowing an improvement in the illumination efficiency.

In the present invention, an optical path changing element for changing the optical path of the light emerging from the polarization conversion optical element may be disposed on the emitting side of the polarization conversion optical element. If the optical path changing element is disposed such that the resultant illumination light is directed in a direction parallel to a plane defined by the optical axes of the two light sources having rather large sizes, then it becomes possible to reduce the size of the polarized light illumination apparatus in one direction. That is, a polarized light illumination apparatus with a small thickness can be realized. If this polarized light illumination apparatus is employed as a light source of a projector, it is possible to realize a projector with a small size.

In the present invention, the small condensing and reflecting elements of the first and second condensing and reflecting optical elements each may include a plurality of curved surface reflecting mirrors. Alternatively, the small condensing and reflecting elements of the first and second condensing and reflecting optical elements may be formed of a lens and a reflecting surface formed on the side of the lens opposite to the polarized light separating optical element so that the lights emitted from the light sources are easily separated into a plurality of intermediate lights. If the curved surface reflecting mirrors are constructed in a decentered fashion or lenses are constructed in a decentered fashion, it becomes possible to effectively direct the lights to the illumination area without using the superimposing optical element, and it also becomes possible to reduce the size of the polarization conversion optical element and the condensing optical element.

The polarized light illumination apparatus according to the present invention may be employed in a projector including: an optical modulator for modulating light emitted from the polarized light illumination apparatus; and a projecting optical system for projecting the light modulated by the optical modulator.

The polarized light illumination apparatus may also be employed in a projector capable of displaying a color image, wherein the projector includes: a colored-light separating optical element for separating light emitted from the polarized light illumination apparatus into a plurality of colored lights; a plurality of optical modulators for modulating the respective colored lights separated by the colored-light separating optical element; a colored-light combining optical element for combining the lights modulated by the plurality of optical modulators; and a projecting optical system for projecting the light combined by the colored-light combining optical element.

The polarized light illumination apparatus may also be employed in a projector including: a reflective optical modulator for modulating light emitted from the polarized light illumination apparatus; a polarized beam splitter for separating a plurality of polarized light components, contained in the light emitted from the polarized light illumination apparatus and in the light modulated by the reflective optical modulator, from one another; and a projecting optical system for projecting the light modulated by the reflective optical modulator and then emitted via the polarized beam splitter.

The polarized light illumination apparatus may also be employed in a projector including: a plurality of reflective optical modulators for modulating light emitted from the polarized light illumination apparatus; a polarized beam splitter for separating a plurality of polarized light components, contained in the light emitted from the polarized light illumination apparatus and in the light modulated by the plurality of reflective optical modulators, from one another; a colored-light separating and combining optical element disposed between the polarized light separating optical element and the plurality of reflective optical modulators, for separating the light emitted from the polarized light illumination apparatus into a plurality of colored lights and for combining the colored lights emitted from the plurality of reflective optical modulators; and a projecting optical system for projecting the light modulated by the plurality of reflective optical modulators and then emitted via the colored-light separating and combining optical element and the polarized beam splitter.

The polarized light illumination apparatus may also be employed in a projector including: a colored-light separating optical element for separating light emitted from the polarized light illumination apparatus into a plurality of colored lights; a plurality of reflective optical modulators for modulating the respective colored lights separated by the colored-light separating optical element; a plurality of polarized beam splitter for separating a plurality of polarized light components, contained in the colored lights separated by the colored-light separating optical element and in the colored lights modulated by the plurality of reflective optical modulators, from one another; a colored-light combining optical element for combining the lights modulated by the plurality of reflective optical modulators and then emitted via the plurality of polarized beam splitter; and a projecting optical system for projecting the light combined by the colored-light combining optical element.

As described above, if the polarized light illumination apparatus according to the present invention is employed, it is possible to realize a projector capable of forming a projected image with a high and uniform brightness. Because the polarized light illumination apparatus according to the present invention emits a light with the polarization aligned in the same direction, it is particularly suitable for use in projector using a liquid crystal device as an optical modulator.

In the projector described above, it is desirable that at least one of the first and second light sources be constructed to be detachable. This allows a user to easily carry the projector by detaching one of the light sources.

Furthermore, in the projector described above, it is desirable that at least one of the first and second light sources be capable of selectively turning on. This allows only one of the light sources to be selectively turned on, for example, when the projector is driven by a battery, thereby making it possible to increase the battery life. That is, it is possible to select the brightness of the projected image by turning on only one of the two light sources or both light sources depending on the brightness in the environment or preferences of a user. More specifically, when the projector is used in a light environment, both light sources may be turned on, whereas only one of the light sources may be turned on when it is used in a dark environment.

Furthermore, in the projector described above, the first and second light sources may be different in the spectral characteristics or brightness of emitted light. This makes it possible to easily adjust the color tone of the illumination light as desired.

DETAILED DESCRIPTION OF PREFERRED EMBODIMENTS

Figure 1:
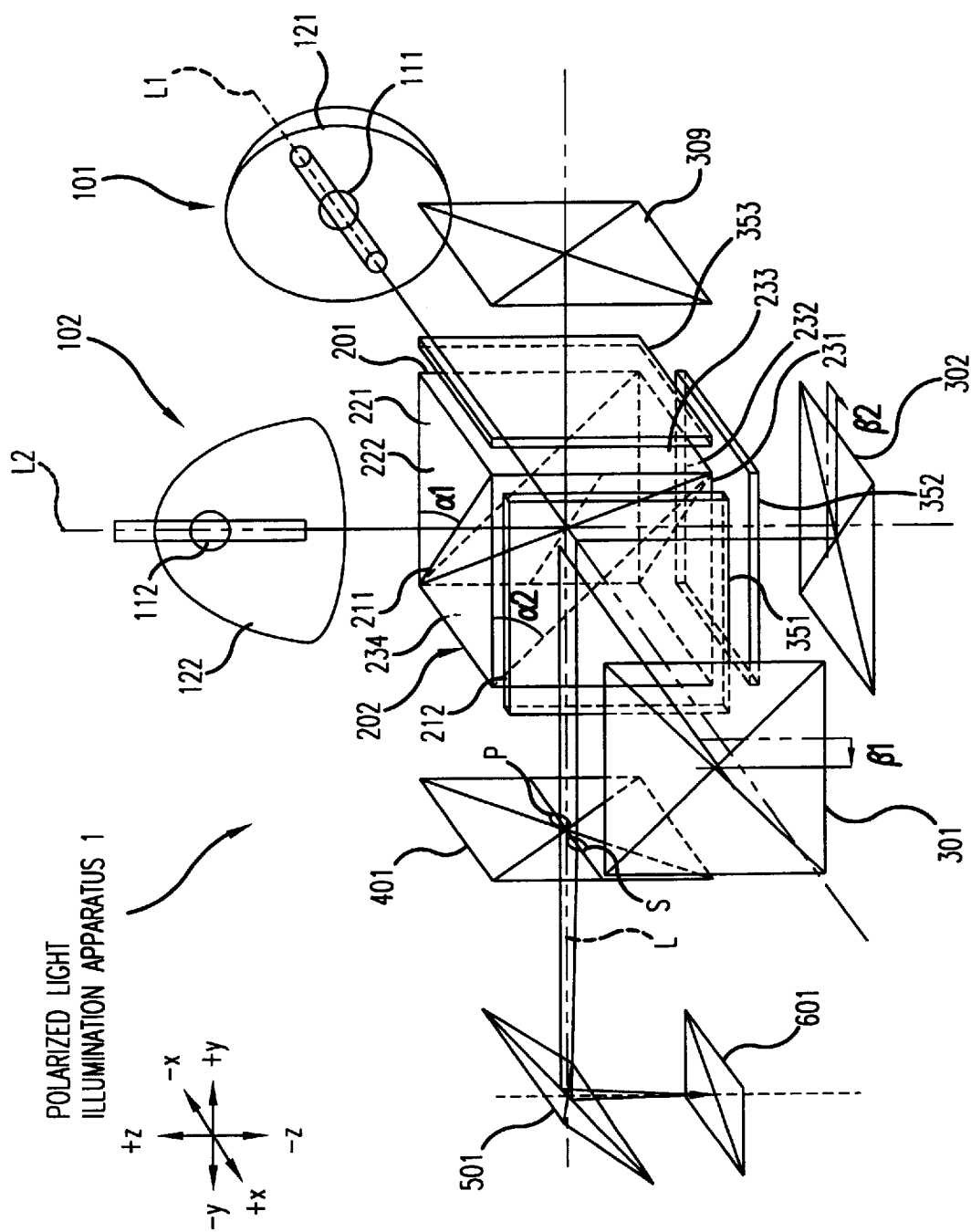
FIG. 1 is a schematic diagram of an optical system constructed to serve as a polarized light illumination apparatus according to a first embodiment of the invention.

Referring to the accompanying drawings, embodiments of the present invention are described below.

In the following description and the accompanying drawings, similar parts are denoted by similar reference numerals, and they are described only once to avoid duplicated descriptions. Three spatial axes orthogonal to one another are denoted by x, y, and z axes, respectively. Two opposite directions along the x axis are denoted by +x and −x directions, respectively. Similarly, two opposite directions along the y axis are denoted by +y and −y directions, respectively, and two opposite directions along the x axis are denoted by +z and −z directions, respectively. Furthermore, linearly polarized light having polarization axes parallel to the x, y, and z directions are referred to as x-polarized light, y-polarized light, and z-polarized light, respectively.

[First Embodiment]

FIG. 1 is a perspective view of a first embodiment of a polarized light illumination apparatus according to the present invention. In this first embodiment, there are provided two light sources, that is, a first light source 101 and a second light source 102, for emitting light polarized in random directions (hereinafter, such light will be referred to as randomly polarized light).

As shown in FIG. 1, the polarized light illumination apparatus of the present embodiment includes: the first light source 101; a polarized light separating optical element 201; a first $\lambda/4$ phase plate 351 (first polarization-state conversion optical element) and a third $\lambda/4$ phase plate 353 (third polarization-state conversion optical element); a first condensing mirror plate 301 (first condensing and reflecting optical element) and a reflecting mirror element 309 (reflecting optical element); a condensing lens unit 401 (condensing optical element, polarization conversion optical element, and superimposing optical element); and a reflecting mirror 501 (optical path changing optical element), wherein these elements are disposed along the system optical axis L1 and L extending in the xy plane and intersecting each other at a right angle. Randomly polarized light emitted from the first light source 101 is first separated by the polarized light separating optical element 201 into two types flight polarized in different directions as will be described later, and then converted into a single type of light polarized in the same direction via the first $\lambda/4$ phase plate 351, the first condensing mirror plate 301, the third $\lambda/4$ phase plate 353, the reflecting mirror element 309, the polarized light separating optical element 201, the second light source 102, and the condensing lens unit 401. The resultant light is directed to a rectangular illumination area 601 via the reflecting mirror 501.

Furthermore, the second light source 102, the polarized light separating optical element 201, a second $\lambda/4$ phase plate 352 (second polarization-state conversion optical element) and the third $\lambda/4$ phase plate 353, a second condensing mirror plate 302 (second condensing and reflecting optical element) and the reflecting mirror element 309, the condensing lens unit 401, and the reflecting mirror 501 are disposed along the system optical axes L2 and L extending in the yz plane and intersecting each other at a right angle. Randomly polarized light emitted from the second light source 102 is first separated into two types of polarized light by the polarized light separating optical element 201 as will be described later and then passes through the second $\lambda/4$ phase plate 352, the second condensing mirror plate 302, the third $\lambda/4$ phase plate 353, the reflecting mirror element 309, the polarized light separating optical element 201, the first light source 101, and the condensing lens unit 401, thereby conversion the two types of polarized light into a single type of light polarized in the same direction as the light emitted from the first light source 101. The resultant light also reaches the rectangular illumination area 601 via the reflecting mirror 501. Thus, the rectangular illumination area 601 is illuminated with one type of light polarized in substantially the same direction. The direction in which the light is directed after being reflected by the reflecting mirror 501 is substantially parallel to the plane in which the first and second light sources 101 and 102 are located.

The first and second light sources 101 and 102 consist mainly of light source lamps 111 and 112, respectively, and parabolic reflectors 121 and 122, respectively. Randomly polarized lights emitted from the light source lamps 111 and 112 are reflected by the parabolic reflectors 121 and 122, respectively, in a single direction. As a result, the reflected lights become substantially parallel and are incident on the polarized light separating optical element 201. Herein, the parabolic reflectors 121 and 122 may be replaced with reflectors of another type such as an ellipsoidal reflector, a spherical reflector, etc. However, in this case, it is desirable to dispose a collimating optical element on the incident side of the polarized light separating optical element 201 so that the lights emitted from the first and second light sources 101 and 102 are collimated by the collimating optical element.

The polarized light separating optical element 201 is realized with a polarized beam splitter formed in a generally hexahedral shape including first and second polarization separating films 211 and 212 made of a dielectric multilayer film disposed in a glass prism 202. The first polarization separating film 211 is disposed at an angle to the direction in which light is emitted from the first light source 101 and also at an angle $\alpha1=45°$ to a first surface 221 of the polarized light separating optical element 201. Similarly, the second polarization separating film 212 is disposed at an angle to the direction in which light is emitted from the second light source 102 and also at an angle $\alpha2=45°$ to a second surface 222 of the polarized light separating optical element 201.

Figure 2:
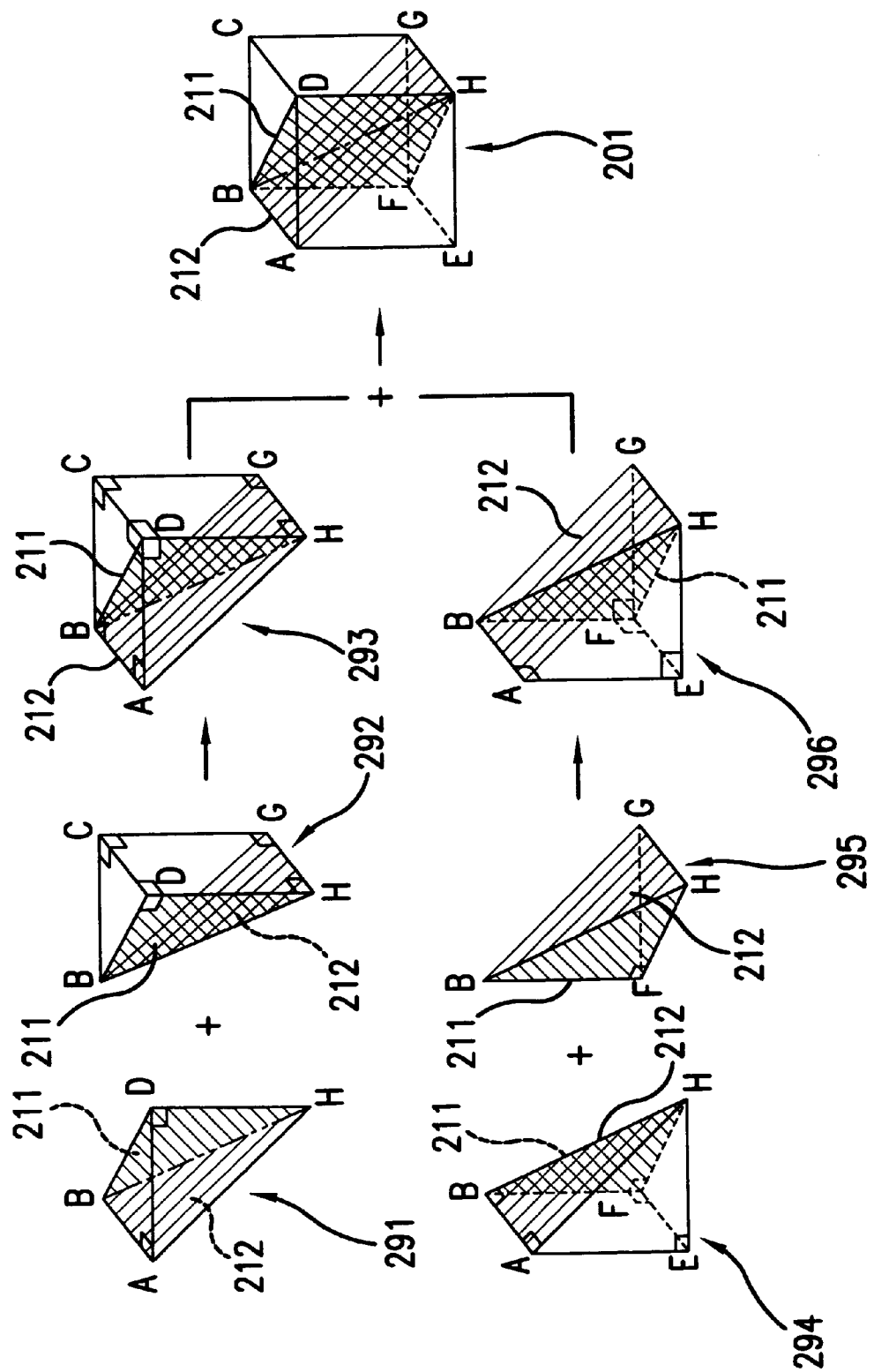
FIG. 2 is a schematic diagram illustrating the detailed structure of a polarized light separating optical element 201.

FIG. 2 illustrates the detailed structure of the polarized light separating optical element 201. As shown in FIG. 2, the polarized light separating optical element 201 consists of two triangular pyramid prisms 291 and 295 and two quadrangular pyramid prisms 292 and 294.

The first polarization separating film 211 is disposed at the interface between a side face BDH of the first triangular pyramid prism 291 and a side face BDH of the first quadrangular pyramid prism 292 and also at the interface between a side face BFH of the second quadrangular pyramid prism 294 and a side face BFH of the second triangular pyramid prism 295. More specifically, the first polarization separating film 211 may be formed by evaporating a dielectric multilayer film on either one of the side face BDH of the first triangular pyramid prism 291 or the side face BDH of the first quadrangular pyramid prism 292 and also on either one of the side face BFH of the second quadrangular pyramid prism 294 or the side face BFH of the second triangular pyramid prism 295. That is, either one of the side face BDH of the first triangular pyramid prism 291 or the side face BDH of the first quadrangular pyramid prism 292 may be employed as a surface on which the first polarization separating film 211 is formed. Similarly, either one of the side face BFH of the second quadrangular pyramid prism 294 or the side face BFH of the second triangular pyramid prism 295 may be employed as a surface on which the first polarization separating film 211 is formed. However, it is desirable that the first polarization separating film 211 formed on the two prisms be flat. To meet this requirement, it is desirable to form the first polarization separating film 211 on the side face BDH of the first triangular pyramid prism 291 and the side face BFH of the second quadrangular pyramid prism 294, or on the side face BDH of the first quadrangular pyramid prism 292 and the side face BFH of the second triangular pyramid prism 295.

Similarly, the second polarization separating film 212 is disposed at the interface between a side face ABH of the first triangular pyramid prism 291 and a side face ABH of the second quadrangular pyramid prism 294 and also at the interface between a side face BGH of the first quadrangular pyramid prism 292 and a side face BGH of the second triangular pyramid prism 295. The second polarization separating film 212 may be formed by evaporating a dielectric multilayer film on either one of the side face ABH of the first triangular pyramid prism 291 or the side face ABH of the second quadrangular pyramid prism 294 and also either one of the side face BGH of the first quadrangular pyramid prism 292 or the side face BGH of the second triangular pyramid prism 295. That is, either one of the side face ABH of the first triangular pyramid prism 291 or the side face ABH of the second quadrangular pyramid prism 294 may be employed as a surface on which the second polarization separating film 212 is formed. Similarly, either one of the side face BGH of the first quadrangular pyramid prism 292 or the side face BGH of the second triangular pyramid prism 295 may be employed as a surface on which the second polarization separating film 212 is formed. However, it is desirable that the second polarization separating film 212 formed on the two prisms be flat. To meet this requirement, it is desirable to form the second polarization separating film 212 on the side face ABH of the first triangular pyramid prism 291 and the side face BGH of the first quadrangular pyramid prism, or on the side face ABH of the second quadrangular pyramid prism 294 and the side face BGH of the second triangular pyramid prism 295.

The side face BDH of the first triangular pyramid prism 291 and the side face BDH, on which the first polarization separating film 211 is formed, of the first quadrangular pyramid prism 292 are adhesively bonded to each other thereby forming a first prism assembly 293. Similarly, the side face BFH of the second quadrangular pyramid prism 294 and the side face BFH, on which the first polarization separating film 211 is formed, of the second triangular pyramid prism 295 are adhesively bonded to each other thereby forming a second prism assembly 296. Finally, the two prism assemblies are combined together by adhesively bonding their side faces ABGH to each other wherein the second polarization separating film 212 is formed on one of the side faces ABGH, thereby obtaining the polarized light separating optical element 201 in a complete form. The above-described procedure of assembling the four prisms is merely an example, and the four prisms may also be assembled according to a different procedure.

Referring again to FIG. 1, the first $\lambda/4$ phase plate 351 is disposed at the side of the third surface 231 of the polarized light separating optical element 201 such that the first $\lambda/4$ phase plate 351 opposes the third surface 231. Furthermore, the first condensing mirror plate 301 is disposed at the back of the $\lambda/4$ phase plate 351. In this embodiment, the first $\lambda/4$ phase plate 351 and the first condensing mirror plate 301 are substantially parallel to the third surface 231. On the side of a fourth surface 233 of the polarized light separating optical element 201, the third $\lambda/4$ phase plate 353 is disposed at a location opposing the fourth surface 233 of the polarized light separating optical element 201, and the reflecting mirror element 309 is disposed at the back of the third $\lambda/4$ phase plate 353. In this embodiment, the third $\lambda/4$ phase plate 353 and the reflecting mirror element 309 are disposed such that they become substantially parallel to the fourth surface 233. On the side of a fifth surface 232 of the polarized light separating optical element 201, the second $\lambda/4$ phase plate 352 is disposed at a location opposing the fifth surface 232 of the polarized light separating optical element 201, and the second condensing mirror plate 302 is disposed at the back of the second $\lambda/4$ phase plate 352. In this embodiment, the second $\lambda/4$ phase plate 352 and the second condensing mirror plate 302 are disposed such that they become substantially parallel to the fifth surface 232. The structure of the first and second condensing mirror plates 301 and 302 will be described in detail later. In FIG. 1, for ease of a visual understanding, the first to third $\lambda/4$ phase plates 351, 352, and 353 are spaced from the polarized light separating optical element 201. However, in practice, it is desirable that they be in close contact with the polarized light separating optical element 201.

At the side of a sixth surface 234 of the polarized light separating optical element 201, the condensing lens unit 401 including a condensing lens plate 411 (condensing optical element), a $\lambda/2$ phase plate 421 (polarization conversion optical element), and a superimposing lens 431 (superimposing optical element) is disposed such that it faces in a direction substantially perpendicular to the optical axis L of the system.

In the polarized light illumination apparatus 1 constructed in the above-described manner, randomly polarized light emitted from the first light source 101 is directed to the condensing lens unit 401 or to the second light source 102 via a process described below.

Figure 3:
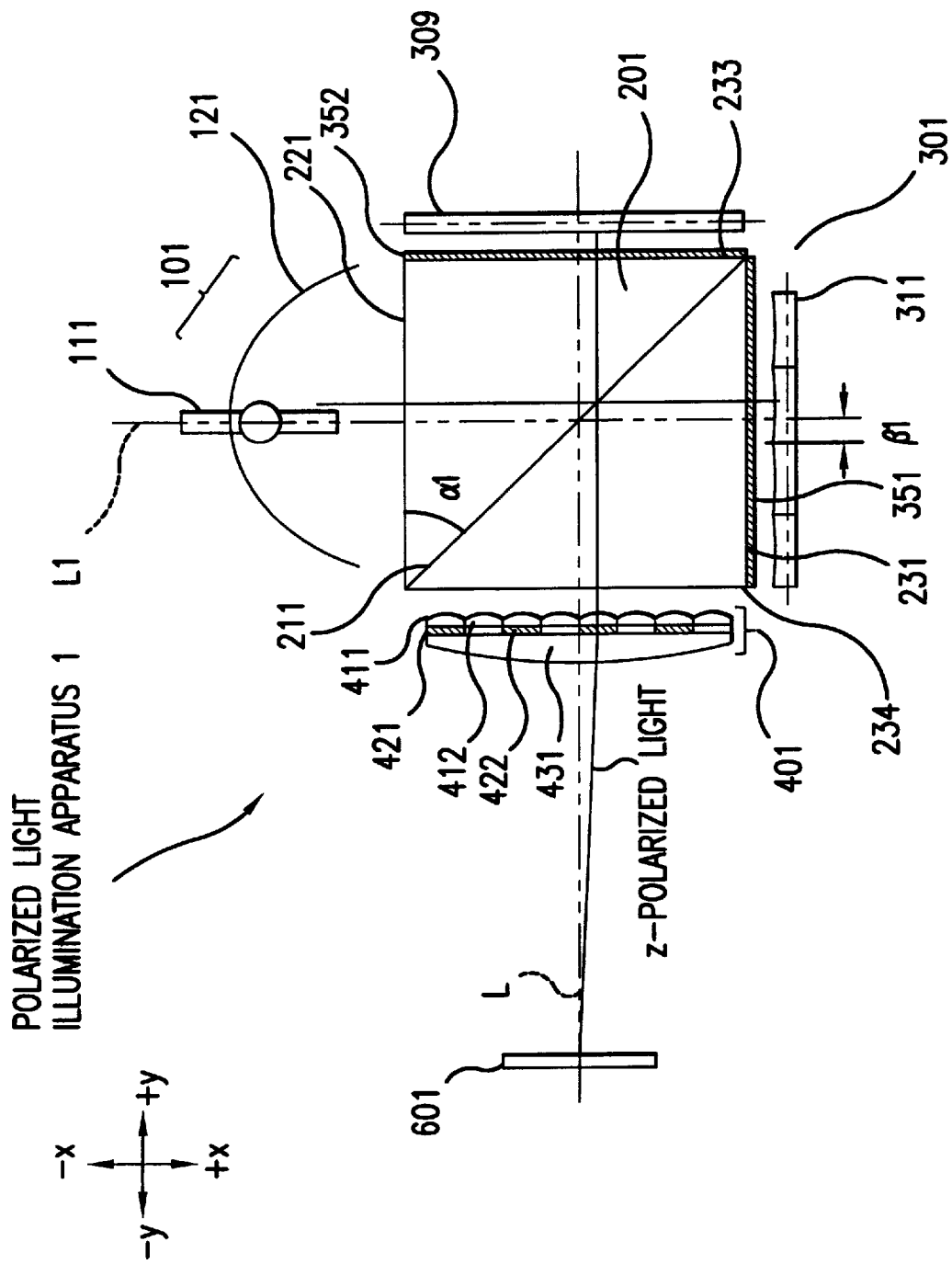
FIG. 3 is a schematic diagram illustrating the basic construction of the optical system constructed to serve as the polarized light illumination apparatus according to the first embodiment of the invention.
Figure 9:
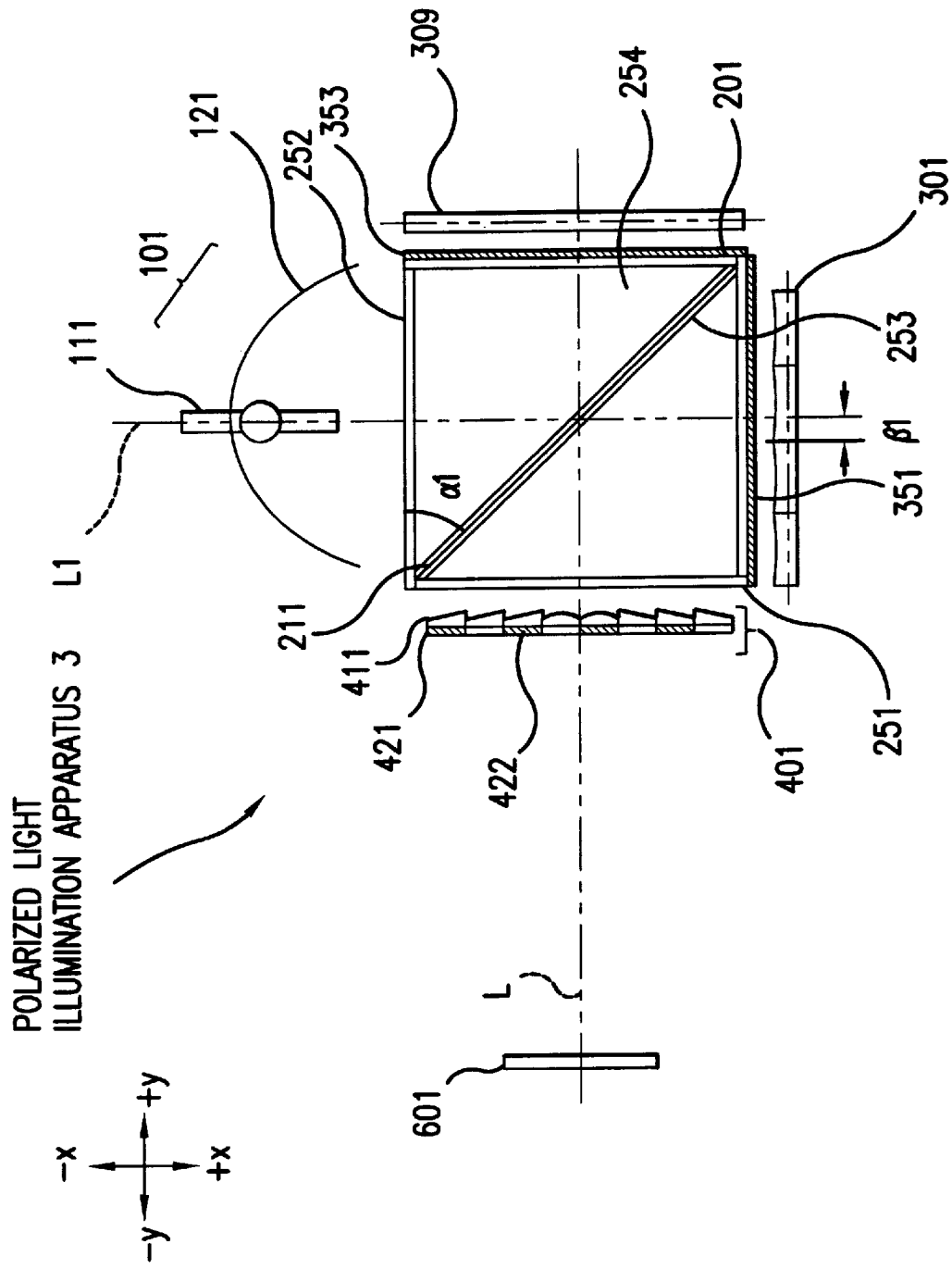
FIG. 9 is a schematic diagram illustrating the basic construction of an optical system constructed to serve as a polarized light illumination apparatus according to a third embodiment of the invention.
Figure 10:
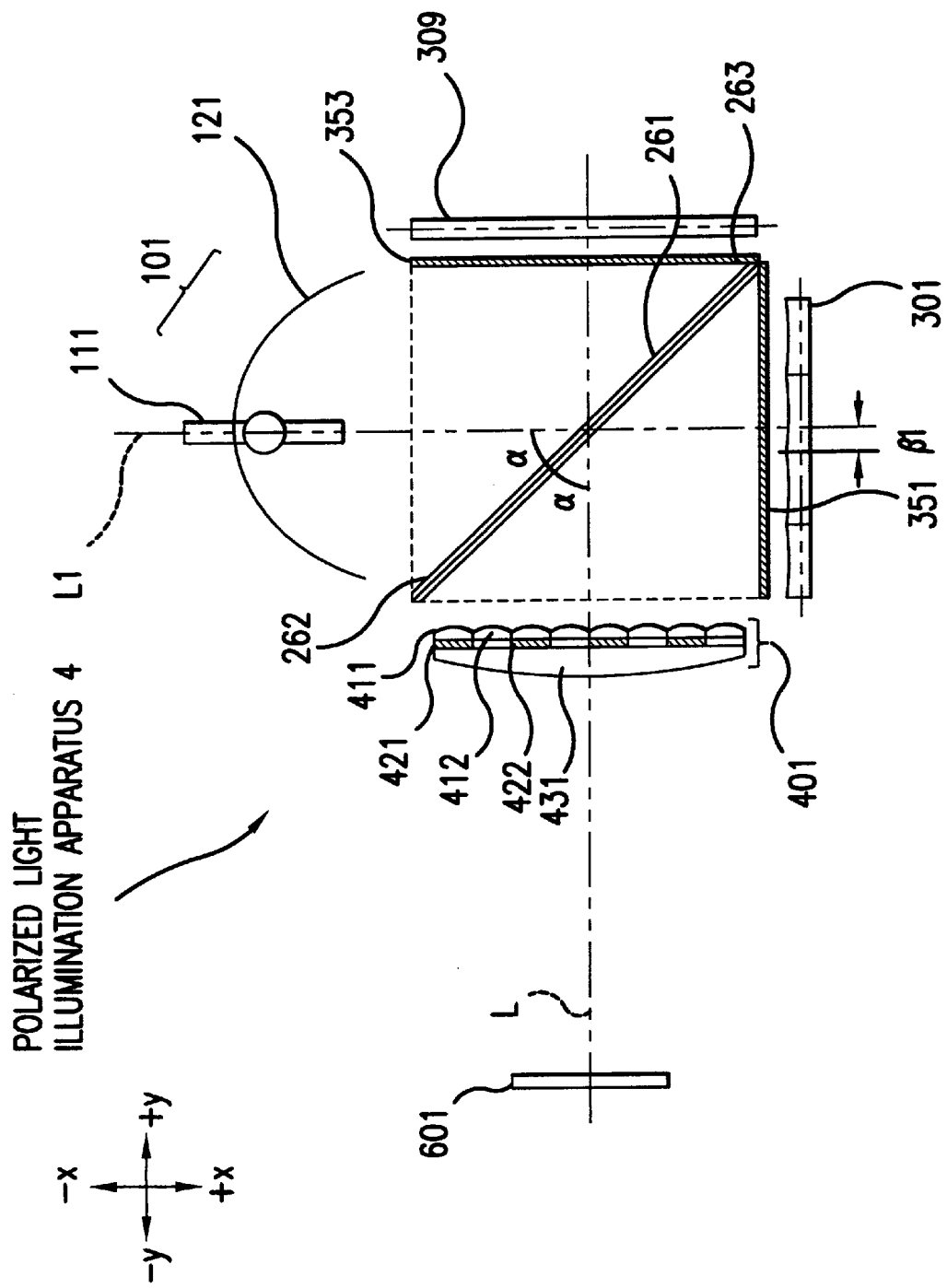
FIG. 10 is a schematic diagram illustrating the basic construction of an optical system constructed to serve as a polarized light illumination apparatus according to a fourth embodiment of the invention.

FIG. 3 is a cross-sectional view of FIG. 1, taken in the by plane. Note that although not shown in FIG. 3, the second polarization separating film 212 is formed in the polarized light separating optical element 201 such that it extends across the xy plane. The reflecting mirror 501 is not shown in FIG. 3, because it is not concerned with the present process. Thus, the optical path from the condensing lens unit 401 to the illumination area 601 is represented as being straight. FIGS. 9 and 10 which will be described later are also drawn in a similar manner.

Randomly polarized light emitted from the first light source 101 can be regarded as mixed light of y-polarized light and z-polarized light. After being emitted from the first light source 101, if the mixed light is incident on the first surface 221 of the polarized light separating optical element 201, the mixed light is separated by the first polarization separating film 211 into two types of polarized light, that is, y-polarized light and z-polarized light. More specifically, the y-polarized light contained in the randomly polarized light passes through the first polarization separating film 211 and travels toward the third surface 231. On the other hand, the z-polarized light is reflected by the polarization separating film 211 toward the fourth surface 233 of the polarized light separating optical element 201.

The two polarized lights separated by the polarized light separating optical element 201 pass through the first and third $\lambda/4$ phase plates 351 and 353, respectively, and then are reflected by the first condensing mirror plate 301 and the reflecting mirror element 309, respectively.

Figure 4:
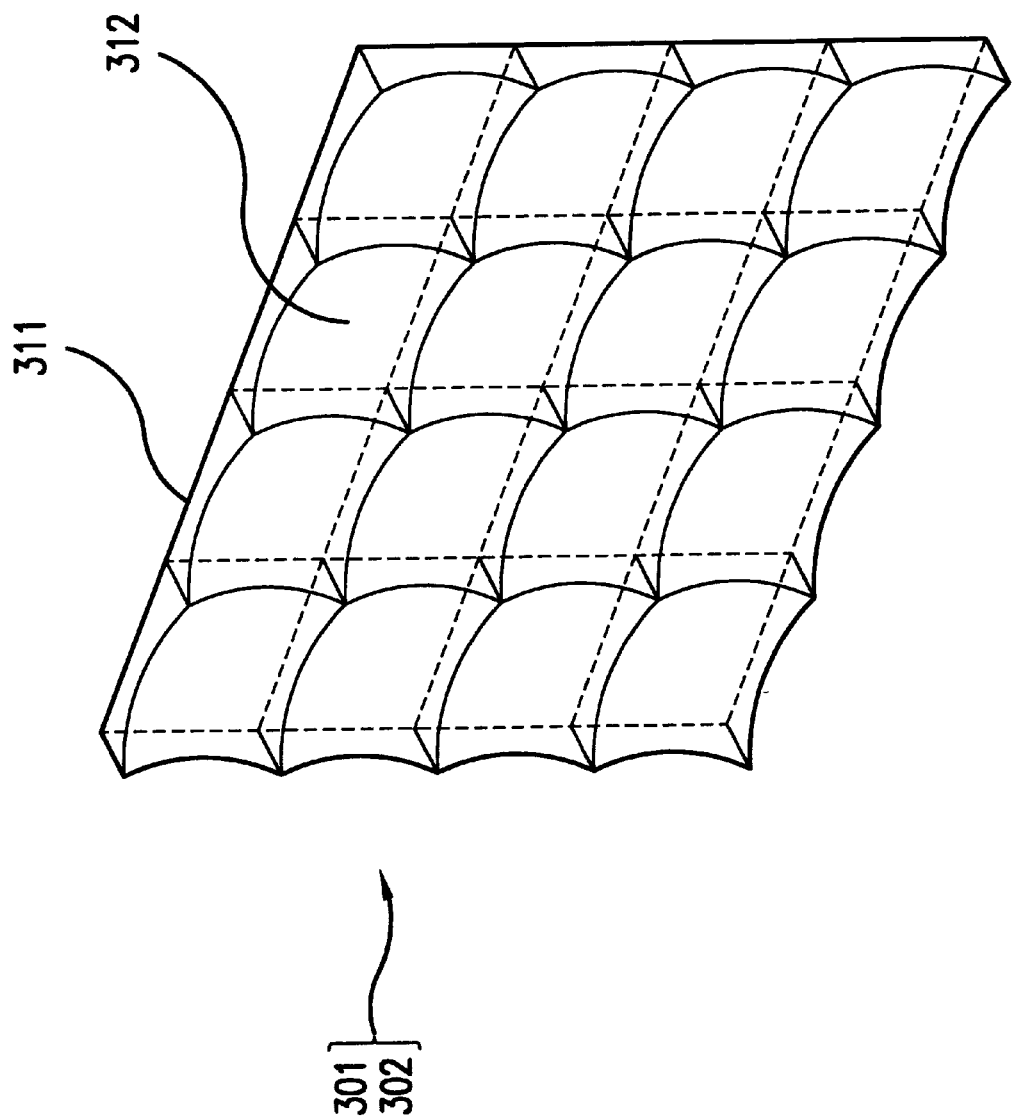
FIG. 4 is a perspective view of a condensing mirror plate used in the polarized light illumination apparatus shown in FIG. 1.

The first condensing mirror plate 301 includes, as shown in FIG. 4, a plurality of small condensing mirrors 311 each having the same rectangular shape and arranged in a matrix fashion wherein each small condensing mirror is geometrically similar to the illumination area 601. Reflecting surface 312 is formed on the surface of each small condensing mirror 311 by depositing an aluminum film or a dielectric multilayer film. In this embodiment, the reflecting surface 312 of each small condensing mirror 311 is formed in a spherical shape. However, the reflecting surface 312 may also have another curvature. For example, a paraboloidal surface, an ellipsoidal surface, or a topic surface may also be employed depending on the characteristics of the incident light emitted from the first and second light sources 101 and 102. The second condensing mirror plate 302 which will be described later also has a similar structure. The reflecting mirror element 309 is a flat plane reflecting mirror of a widely used type. A reflecting surface 312 formed of an aluminum film or a dielectric multilayer film is disposed on the surface of the reflecting mirror element 309.

Figure 5:
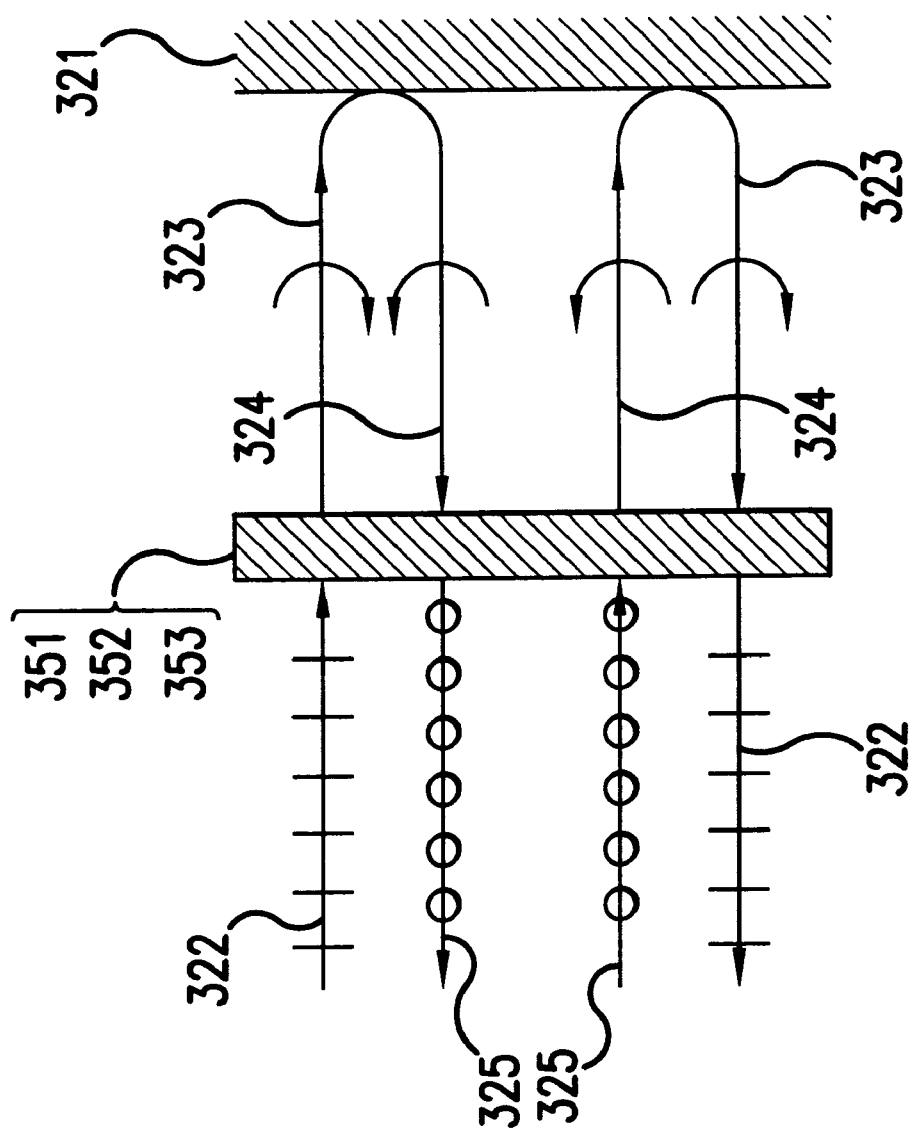
FIG. 5 is a schematic diagram illustrating a polarizing process performed in the polarized light illumination apparatus shown in FIG. 1.

The y-polarized light and the z-polarized light separated by the first polarization separating film 211 pass through the first and third λ/4 phase plates 351 and 353, respectively, and then are reflected by the first condensing mirror plate 301 and the reflecting mirror element 309, respectively. When they again pass through the λ/4 phase plates 351 and 353, the traveling direction of each polarized light is changed by substantially 180° and the polarization direction is rotated by substantially 90°. This process is described in further detail below with reference to FIG. 5. Note that, for simplicity of illustration, the condensing mirror plate 301 is represented as if it were formed in a flat-plate shape. The y-polarized light 322 incident on the λ/4 phase plate 351 is converted by the λ/4 phase plate 351 to a clockwise-rotating circularly polarized light 323 (note that the y-polarized light 322 can be converted to a counterclockwise-rotating light depending on the manner in which the λ/4 phase plate 351 is disposed). The resultant light 323 travels to the mirror plate 321. When the light is reflected by the mirror plate 321, the rotation direction of the polarization axis is changed. More specifically, clockwise-rotating circularly y-polarized light is converted to counterclockwise-rotating circularly y-polarized light (counterclockwise-rotating circularly y-polarized light is converted to a clockwise-rotating circularly y-polarized light). Thus, the traveling direction of the light 323 is converted by the mirror plate 321 by substantially 180° and the light 323 becomes counterclockwise-rotating circularly polarized light 324. The resultant light 324 again passes through the λ/4 phase plates 351 and 353 and is converted to a z-polarized light 325 when it passes through these λ/4 phase plates. On the other hand, the z-polarized light 325 incident on the λ/4 phase plate is converted to a y-polarized light 322 via a similar process.

Referring again to FIG. 3, when the y-polarized light reaches the third surface 231, its traveling direction is converted by substantially 180° and its polarization is converted to z-polarization by the first λ/4 phase plate 351 and the first condensing mirror plate 301. The resultant light is then reflected by the first polarization separating film 211 toward the sixth surface 234. Herein, the z-polarized light is not affected by the second polarization separating film 212 (not shown) because the second polarization separating film 212 is located substantially perpendicular to the yz plane.

Because the first condensing mirror plate 301 includes small condensing mirrors 311 each having the capability of condensing light, the traveling direction of the polarized light is reversed, and as many condensed images are formed as there are small condensing mirrors 311 forming the condensing mirror plate 301. These condensed images are images of the light source. Thus, hereinafter, the condensed images will be referred to as secondary light source images. In the present embodiment, the condensing lens unit 401 is disposed at a location where the secondary light source images are formed. That is, the z-polarized light transmitted through the sixth surface forms a plurality of secondary light source images at particular locations on the condensing lens unit 401.

The first condensing mirror plate 301 is disposed such that the first condensing mirror plate 301 is shifted in parallel in the −y direction until the center of the first condensing mirror plate 301 is apart from the x axis by β1. As a result, the z-polarized light reflected by the small condensing mirrors 311 of the first condensing mirror plate 301 is incident on the condensing lens unit 401 in such a manner that the center axis of the z-polarized light is shifted in the −x direction from the optical axis L of the system, and thus the z-polarized light strikes a point P on the condensing lens unit 401 (refer to FIG. 1). That is, the plurality of secondary light source images are formed on the condensing lens unit 401, at locations slightly shifted in the −x direction, by the z-polarized light via the first condensing mirror plate 301. In this embodiment, the amount of shifting is equal to the absolute value of β1.

On the other hand, the z-polarized light which has reached the fourth surface 233 is converted in terms of the traveling direction by substantially 180° and in terms of the polarization into y-polarization by the third λ/4 phase plate 353 and the reflecting mirror element 309. The resultant y-polarized light returns to the polarized light separating optical element 201. Herein, because the second polarization separating film 212 (not shown) is disposed substantially perpendicular to the yz plane, the y-polarized light is reflected by the second polarization separating film 212 toward the second light source 102 (not shown). The reflecting mirror element 309 is disposed such that its center is located substantially on the y axis.

As described above with reference to FIG. 3, the y-polarized light contained in the randomly y-polarized light emitted from the first light source 101 is converted to z-polarized light and incident on the condensing lens unit 401. On the other hand, the z-polarized light contained in the randomly y-polarized light emitted from the first light source 101 is converted to y-polarized light and incident on the second light source 102 (not shown).

Referring now to FIG. 1, the process is described below via which the randomly y-polarized light emitted from the second light source 102 is directed to the condensing lens unit 401 or to the first light source 101. The randomly polarized light emitted from the second light source 102 is separated into x-polarized light and y-polarized light via a process similar in principle to that via which the randomly polarized light emitted from the first light source 101 is separated. After that, the y-polarized light is converted to x-polarized light and incident on the condensing lens unit 401. On the other hand, the x-polarized light is converted to z-polarized light and incident on the first light source 101. That is, the y-polarized light contained in the randomly polarized light emitted from the second light source 102 passes through the second polarization separating film 212 of the polarized light separating optical element 201 and travels toward the fifth surface 232. On the other hand, the x-polarized light contained in the randomly polarized light emitted from the second light source 102 is reflected by the second polarization separating film 212 toward the fourth surface 233. The y-polarized light and the x-polarized light separated from the randomly polarized light pass through the second and third λ/4 phase plates 352 and 353, respectively, and then reflected by the second condensing mirror plate 302 and the reflecting mirror element 309, respectively. After that, they again pass through the λ/4 phase plates 352 and 353, respectively. The y-polarized light which has reached the fifth surface 232 is converted in terms of the traveling direction by substantially 180° and in terms of the polarization into x-polarization by the second λ/4 phase plate 352 and the second condensing mirror plate 302. The resultant x-polarized light is then reflected by the second polarization separating film 212 toward the sixth surface 234. Herein, the x-polarized light is not affected by the first polarization separating film 211 because the first polarization separating film 211 is located substantially perpendicular to the by plane.

On the other hand, the x-polarized light which has reached the fourth surface 233 is converted in terms of the traveling direction by substantially 180° and in terms of the polarization into z-polarization by the third λ/4 phase plate 353 and the reflecting mirror element 309. The resultant z-polarized light is again reflected by the first polarization separating film 211 toward the first light source 101.

Like the first condensing mirror plate 301, the second condensing mirror plate 302 also includes small condensing mirrors 311, each having the capability of condensing light and is disposed such that the second condensing mirror plate 302 is shifted in parallel in the +x direction until the center of the second condensing mirror plate 302 is apart from the z axis by β2. As a result, the x-polarized light reflected by the small condensing mirrors 311 of the second condensing mirror plate 302 is incident on the condensing lens unit 401 in such a manner that the center axis of the x-polarized light is shifted in the +x direction from the optical axis L of the system, and thus the x-polarized light strikes a point S on the condensing lens unit 401 (refer to FIG. 1). That is, a plurality of secondary light source images are formed on the condensing lens unit 401, at locations slightly shifted in the +x direction, by the x-polarized light via the second condensing mirror plate 302. In this embodiment, the amount of shifting is equal to the absolute value of β2.

Figure 6:
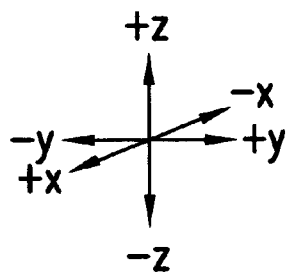
FIG. 6 is a perspective view of a lens plate used in the polarized light illumination apparatus shown in FIG. 1.
Figure 6:
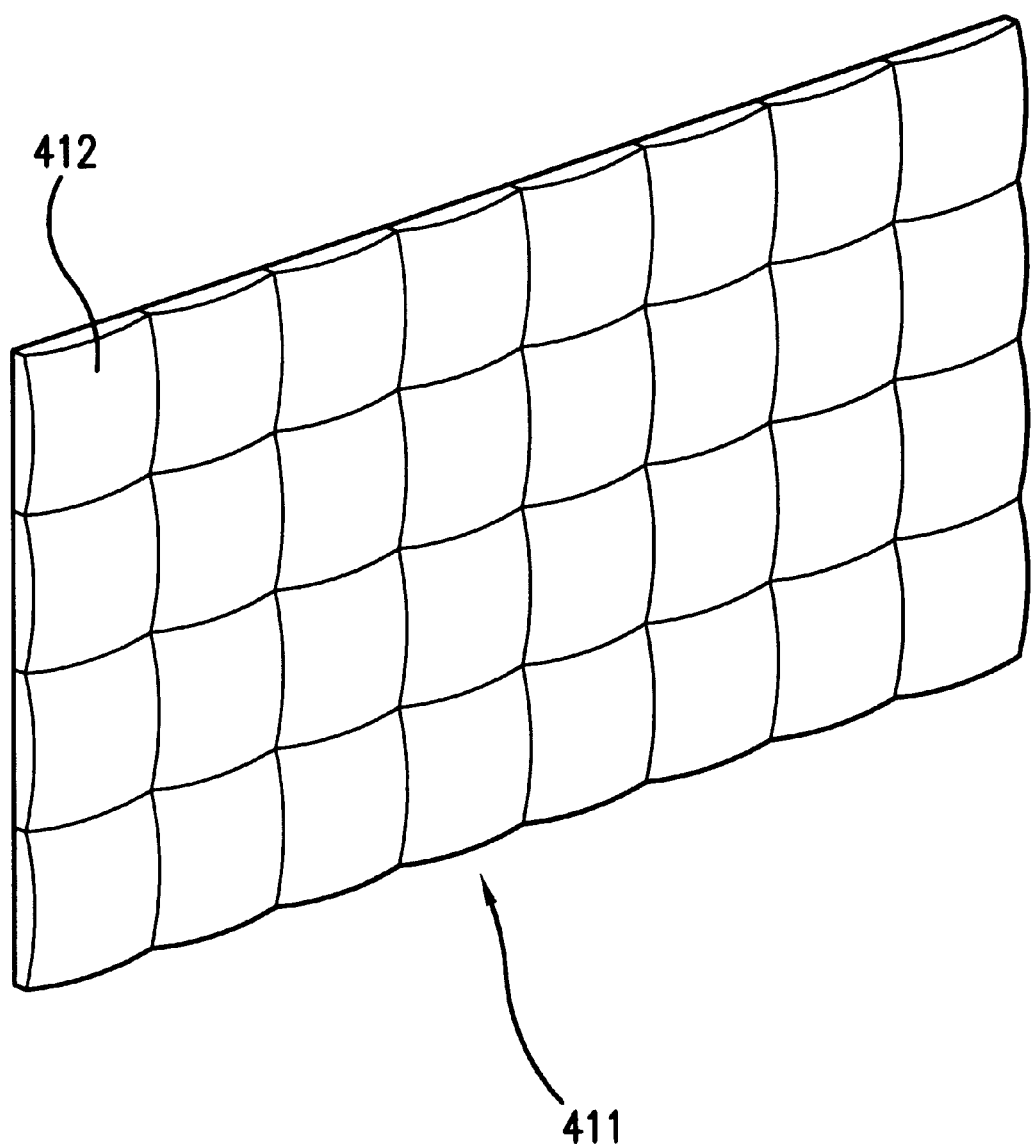

FIG. 6 illustrates the appearance of the condensing lens plate 411 of the condensing lens unit 401. As shown in FIG. 6, the condensing lens plate 411 includes a plurality of rectangular small lenses 412. Herein, the number of rectangular small lenses 412 is equal to or twice the number of small condensing mirrors 311 forming the first and the second condensing mirror plates 301 and 302. In the case where the number of small condensing mirrors 311 of the first condensing mirror plate 301 is different from that of the second condensing mirror plate 302, the number of small condensing mirrors 311 may be adjusted on the basis of the number of small condensing mirrors of the condensing mirror plate having the greatest number of small condensing mirrors. In the present embodiment, the condensing lens plate 411 includes twice as many small lenses 412 as the number of small condensing mirrors 311 forming the first condensing mirror plate 301. In order that the polarized lights from the first and second light sources 101 and 102 are focused at different spatial points, as will be described later, the small lenses 412 are disposed at locations corresponding to the focusing points of the respective polarized lights. More specifically, in the present embodiment, the number of small lenses 412 disposed in each line along the x direction is twice the number of small condensing mirrors 311 forming the first condensing mirror plate 301 (second condensing mirror plate 302) so that the secondary light source images formed by the light from the first light source 101 are slightly shifted in the x direction from the secondary light source images formed by the light from the second light source 102 without having overlapping among them.

Figure 7:
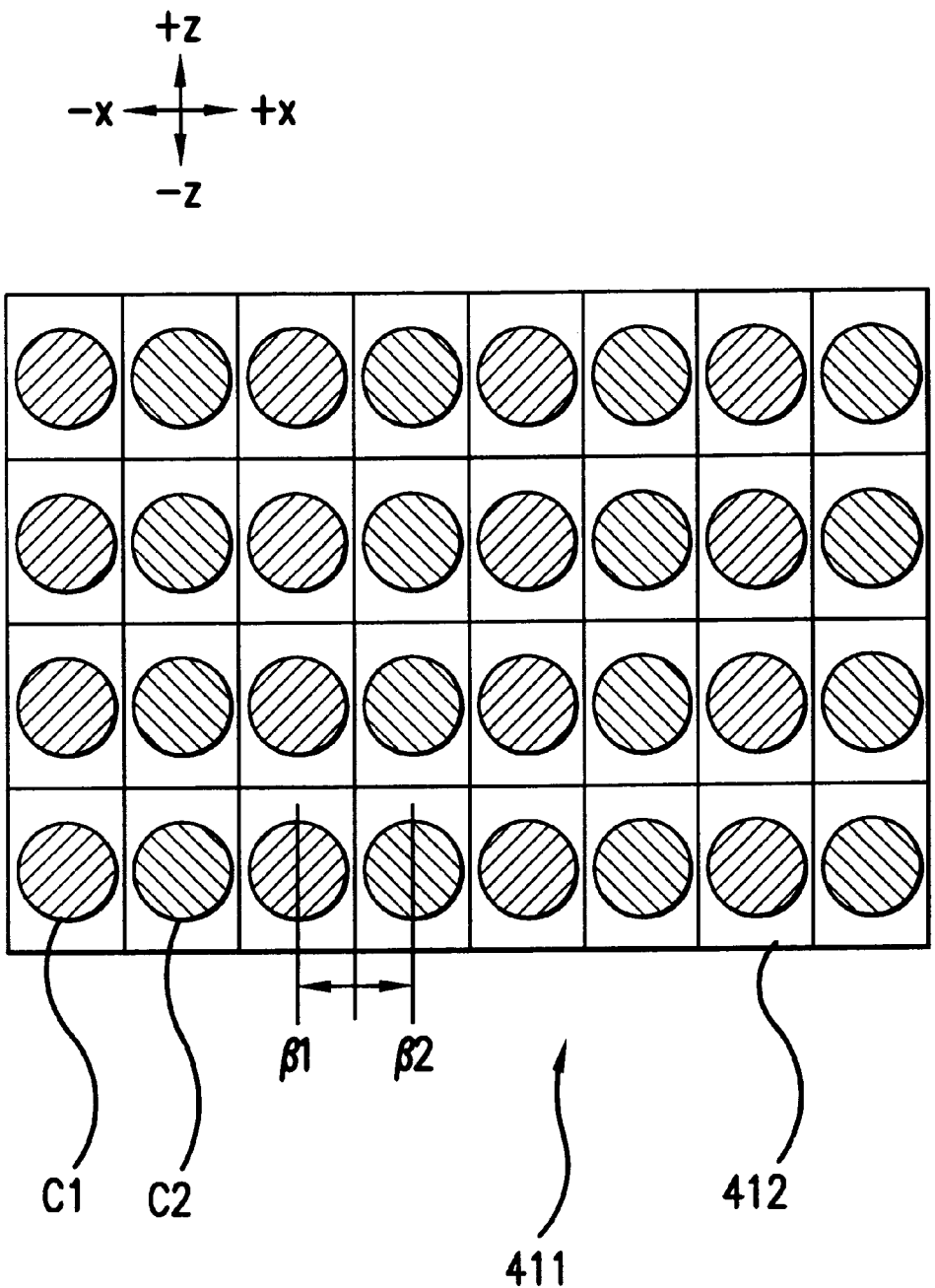
FIG. 7 is a schematic diagram illustrating locations where secondary light source images are formed on the condensing lens plate of the polarized light illumination apparatus shown in FIG. 1.

As shown in FIG. 7, when the condensing lens plate 411 is viewed from the side of the illumination area 601, the secondary light source images C1 (circular images shaded with lines diagonally extending from the left and bottom to the right and top) formed by the z-polarized light correspond to the small lenses 412 in a such a way that each secondary light source image C1 in the z direction has its corresponding small lens 412 whereas every other secondary light source image C1 in the x direction has its corresponding small lens 412. Furthermore, when the condensing lens plate 411 is viewed from the side of the illumination area 601, the secondary light source images C2 (circular images shaded with lines diagonally extending from the right and bottom to the left and top) formed by the x-polarized light correspond to the small lenses 412 in a such a way that each secondary light source image C2 in the z direction has its corresponding small lens 412 whereas every other secondary light source image C2 in the x direction has its corresponding small lens 412. Thus, as described above, the secondary light source images C1 formed by the polarized light from the first light source 101 and the secondary light source images C2 formed by the polarized light from the second light source 102 are alternately located in the x direction. Such an arrangement is achieved, as described earlier, because the first condensing mirror plate 301 is located such that the center of the condensing mirror plate 301 is shifted in parallel by β1 in the −y direction from the x axis and the second condensing mirror plate 302 is located such that the center of the condensing mirror plate 301 is shifted in parallel by β2 in the +x direction from the x axis. In this embodiment, because the number of small lenses 412 of the condensing lens unit 401 is set to twice the number of small condensing mirrors 311 of the first condensing mirror plate 301 (and of the second condensing mirror plate 302), β1 and β2 are set to one-half the length of one small lens 412 measured in the x direction. In the case where the number of small lenses 412 of the condensing lens unit 401 is set to be equal to the number of small condensing mirrors 311 of the first condensing mirror plate 301 (and of the second condensing mirror plate 302), β1 and β2 are preferably set to one-quarter the length of one small lens 412 measured in the x direction.

With the structure described above, the z-polarized light which reaches the condensing lens unit 401 via the first condensing mirror plate 301 after being emitted from the first light source 101 is substantially parallel, in terms of the main light, to the x-polarized light which reaches the condensing lens unit 401 via the second condensing mirror plate 302, wherein the z-polarized light and the x-polarized light are incident on the condensing lens unit 401 without producing overlapping with each other such that these two lights form secondary light source images at different spatial locations.

On the surface, on the side of the illumination area 601, of the condensing lens plate 411 of the condensing lens unit 401, there is provided a λ/2 phase plate 421 including a phase layer 422 selectively formed at locations corresponding to the locations of the secondary light source images C1 formed by the z-polarized light. When the z-polarized light passes through the phase layer 422, the polarization axis is rotated such that the z-polarized light is converted to x-polarized light. On the other hand, no phase layer 422 is formed in the optical path associated with the x-polarized light so that the x-polarized light passes through the λ/2 phase plate 421 without undergoing rotation of the polarization axis and while maintaining the state of polarization in the x-polarization. As a result, almost all lights become an x-polarized light after passing through the condensing lens unit 401.

The lights whose polarization is aligned into the x direction via the above-described process are superimposed by the superimposing lens 431 disposed on the side, facing the illumination area 601, of the λ/2 phase plate 421, upon one another at a single location in the illumination area 601. In this process, as shown in FIG. 1 (but now shown in FIG. 3), after the traveling direction of the illumination light is bent by substantially 90° by the reflecting mirror 501 disposed between the superimposing lens 431 and the illumination area 601, the illumination light reaches the illumination area 601. More specifically, the plurality of images formed by the small condensing mirrors of the first and second condensing mirror plates 301 and 302 are superimposed by the condensing lent plate 411 and the superimposing lens 431 into a single image at the same location, and the state of polarization becomes the same when the light passes through the λ/2 phase plate 421. Thus, almost all lights finally reach the illumination area 601. Because the illumination area 601 is illuminated with the plurality of secondary light source images, the variation in the illumination intensity is very small. That is, all illumination area is uniformly illuminated with the light polarized in substantially the same direction.

The part of the light emitted from the first light source 101 which is incident as the x-polarized light on the second light source 102 after passing through the polarized light separating optical element 201 and the part of the light emitted from the second light source 102 which is incident as the z-polarized light on the first light source 101 after passing through the polarized light separating optical element 201 arc both reflected by the reflectors 121 and 122 of the respective light sources and then again output from the respective light sources. However, when the lights are reflected by the reflectors, the polarization axis is rotated. As a result, a part of each light becomes a polarized light which is allowed to pass through the first or second polarization separating film 211 or 212, and is incident on the first condensing mirror plate 301 or the second condensing mirror plate 302. As a result, the polarized lights incident on the first and second light sources 101 and 102, respectively, are eventually incident on the condensing lens unit 401 and thus they are used in a highly efficient fashion.

In the polarized light illumination apparatus 1 of the present embodiment, as described above, the randomly polarized lights emitted from the first and second light sources 101 and 102 are first separated by the polarized light separating optical element 201 into two different types of polarized light, and then the two types of polarized light are introduced into predetermined parts of the λ/2 phase plate 421 so that the z-polarized light is converted to an x-polarized light. Thus, the randomly polarized lights emitted from the first and second light sources 101 and 102 are converted into a single type of polarized light without producing substantially any loss, whereby the illumination area 601 is illuminated brightly. Even though two light sources 101 and 102 are used, the illumination lights emitted from the two light sources 101 and 102 can be combined together without causing an increase in the incident angle (illumination angle) of the illumination lights to the illumination area. This means that the illumination light has the same cross section as obtained when only one light source is used. Therefore, it is possible to increase the amount of light per unit area to a level approximately twice that obtained with a single light source. Furthermore, the two light sources, that is, the first and second light sources 101 and 102 can both be disposed in the xz plane. In this case, the reflecting mirror 501 is disposed such that the traveling direction of the illumination light emitted through the condensing lens unit 401 is changed by the reflecting mirror 501 so that the illumination light is emitted in a direction parallel to the xz plane in which the two light sources are disposed. This allows the illumination apparatus to be formed in a small shape in height or depth. That is, the reflecting mirror 501 disposed at the stage following the condensing lens unit 401 makes it possible to design the polarized light illumination apparatus with a small size in a more flexible fashion.

To introduce the two types of polarized light into the predetermined parts of the λ/2 phase plate 421, the polarized light separating optical element 201 is required to have high polarized light separation performance. In the present embodiment, to meet the above requirement, polarized light separating optical element 201 is formed using a glass prism and a dielectric multilayer film so that it is thermally stable in the polarized light separation performance. Thus, even when this polarized light separating optical element 201 is used in an illumination apparatus required to output a high optical power, the polarized light separating optical element 201 can provide stable polarized light separation performance. Therefore, it is possible to realize a polarized light illumination apparatus having desired high performance.

Furthermore, in the present embodiment, the small condensing mirrors 311 of the first and second condensing mirror plates 301 and 302 are formed in a rectangular shape longer in the horizontal direction than in the vertical direction to fit the rectangular shape of the illumination area 601 (that is, the small condensing mirrors are formed to have a substantially similar shape to that of the illumination area), and the direction in which the two types of polarized light emitted from the polarized light separating optical element 201 are separated (that is, the direction in which the secondary light source images formed by the two types of polarized light are aligned) is set to be horizontal (in the x direction) to fit the shape of the illumination area 601. This makes it possible to achieve a high illumination efficiency without wasting light even when the illumination area 601 has a rectangular shape longer in the horizontal direction than in the vertical direction.

Furthermore, the center axes of the polarized lights which are incident on the condensing lens 401 via the first and second condensing mirror plates 301 and 302 are parallel to each other. This means that lights reflected by the small condensing mirrors of the first and second condensing mirror plates (condensing and reflecting optical element) are incident at substantially the same angle upon the polarized light separating optical element 201. Therefore, even when the polarized light separation characteristic of the polarized light separating optical element 201 is sensitive to the incident angle of light, polarized light separation can be accomplished in a highly reliable fashion and thus a uniform illumination light can be obtained.

The shifting amounts β1 and β2 of the first and second condensing mirror plates 301 and 302 from the x and y axes and the shifting directions thereof are not limited to those employed in the present embodiment. The shifting amounts β1 and β2 of the first and second condensing mirror plates 301 and 302 and the shifting directions thereof may be set in different manners as long as the secondary light source images produced by the y-polarized lights contained in the light emitted from the first light source 101 and the secondary light source images produced by the y-polarized lights contained in the light emitted from the second light source 102 are spatially separated from each other. For example, as opposed to the present embodiment, the first condensing mirror plate 301 may be shifted in the +y direction and the second condensing mirror plate 302 may be shifted in the −x direction. In this case, z-polarized light emerges from the condensing lens unit 401.

In order that the z-polarized light contained in the light emitted from the first light source 101 and x-polarized light contained in the light emitted from the second light source 102 are incident on the opposite light sources in a highly efficient fashion, it is desirable that the reflecting mirror element 309 be constructed in the form of a flat-plate reflecting mirror whose center is located substantially on the center axis of the polarized light separating optical element 201.

Although in the present embodiment, the λ/2 phase plate 421 is disposed on the surface, facing the illumination area, of the condensing lens plate 411, the λ/2 phase plate 421 may also be disposed at any location which allows the secondary light source images to be properly formed. For example, the λ/2 phase plate 421 may be disposed on the surface facing the polarized light separating optical element of the condensing lens plate 411.

Furthermore, if the small lenses 412 of the condensing lens plate 411 are formed in a decentered fashion such that the lights emerging from the respective small lenses 412 are directed to the illumination area 601, then the condensing lens plate 411 also provides the function which is realized by the superimposing lens 431 in the present embodiment. Alternatively, the small condensing mirrors 311 of the first and second condensing mirror plates 301 and 302 may be formed in a decentered fashion such that the lights reflected by the small condensing mirrors 311 are directed toward the illumination area 601. In this case, the first and second condensing mirror plates 301 and 302 also provide the function realized by the superimposing lens 431 in the above example. Thus, in these two cases, the superimposing lens 431 can be removed. This allows a reduction in the cost of the polarized light illumination apparatus. In the latter case, the distance between the secondary light source images formed by the z-polarized lights and the secondary light source images formed by the x-polarized lights, shown in FIG. 7, becomes smaller than β1+β2.

In the case where the lights emitted from the first and second light sources 101 and 102 have a high degree of parallelism, the condensing lens plate 411 may be removed.

Furthermore, although the small lenses 412 of the condensing lens plate 411 are formed in the shape of a rectangle longer in the horizontal direction than in the vertical direction, there is no particular limitation in the shape. However, because the secondary light source images C1 formed by the z-polarized lights and the second light source images C2 formed by the x-polarized lights are aligned in the horizontal direction as shown in FIG. 7, it is desirable that the shape of the small lenses 412 of the condensing lens plate 411 be determined in accordance with the locations where the secondary light source images are formed.

Furthermore, two different types of phase layers having different characteristics may be disposed at a location where the secondary light sources of the z-polarized lights are formed and at a location where the secondary light sources of the x-polarized lights are formed so that the lights are aligned in terms of polarization into a single particular direction. Alternatively, the phase layer 422 may disposed at a location where the secondary light source images C2 associated with the x-polarized lights are formed such that the illumination light becomes z-polarized.

[Second Embodiment]

Figure 8:
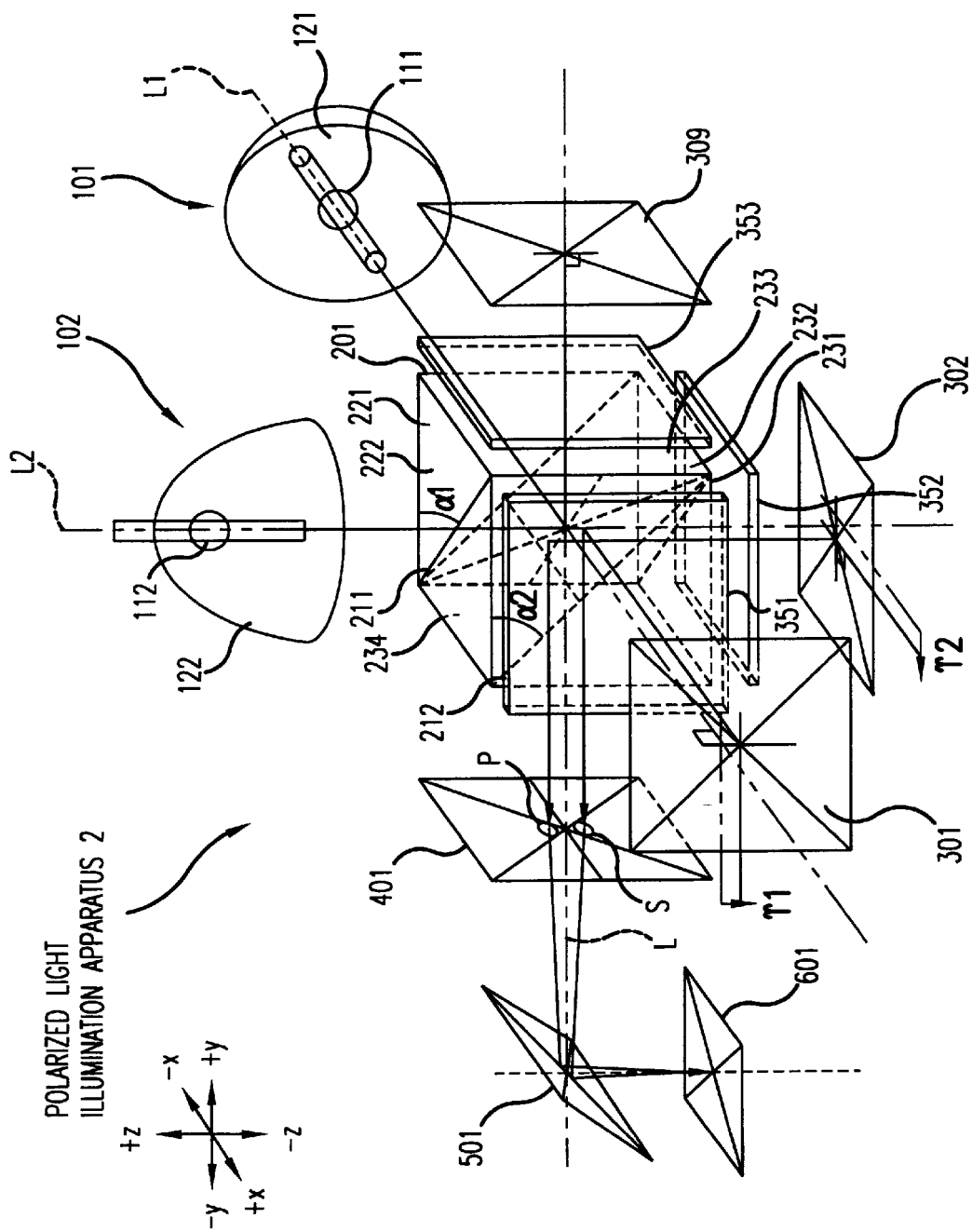
FIG. 8 is a schematic diagram of an optical system constructed to serve as a polarized light illumination apparatus according to a second embodiment of the invention.

In the polarized light illumination apparatus 1 shown in FIG. 1, the first and second condensing mirror plates 301 and 302 are disposed so that the secondary light source images formed by the z-polarized light and the secondary light source images formed by the x-polarized light are aligned substantially in parallel along the x axis. Alternatively, as in a polarized light illumination apparatus 2 shown in FIG. 8, the first and second condensing mirror plates 301 and 302 may be disposed such that the secondary light source images formed by the z-polarized light and the secondary light source images formed by the x-polarized light are aligned substantially in parallel along the z axis. More specifically, for example, the first condensing mirror plate 301 is shifted in parallel in the −z direction such that its center is apart from the x axis by γ1, and the second condensing mirror plate 302 is shifted in parallel in the −y direction such that its center is apart from the z axis by γ2 (as shown in FIG. 8). Alternatively, the first condensing mirror plate 301 may be shifted in parallel in the +z direction such that its center is apart from the x axis by γ1, and the second condensing mirror plate 302 may be shifted in parallel in the +y direction such that its center is apart from the z axis by γ2. In the present embodiment, the secondary light source images are arranged in a manner different from the arrangement in the first embodiment described above. Therefore, it is required to change the manner in which the condensing lens plate 411 and the λ/2 phase plate 421 of the condensing lens unit 401 are arranged in accordance with the arrangement of the secondary light source images. More specifically, the phase layer 422 should be aligned in the z-direction. Also in this case, the basic principles of the polarized light illumination apparatus are similar to those of the polarized light illumination apparatus, and thus they are not described in further detail.

[Third Embodiment]

In the polarized light illumination apparatus 3 shown in FIG. 9 (illustrating a cross section taken along the xy plane), the respective optical systems are disposed in a substantially similar manner as in the first embodiment 1. However, a prism member 251 is formed of six transparent plates 252 serving as side walls, and a first polarized light separating plate 253 in a flat plate form on which a first polarization separating film 211 and a second polarized light separating plate (not shown, and strictly speaking, there are two second polarized light separating plates separated by the first polarized light separating plate 253) in a flat plate form on which a second polarization separating film (not shown) is formed are disposed in the inside of the prism member 251. Furthermore, the inside of the prism member 251 is filled with a liquid 254. The resultant prism member 251 is employed as the polarized light separating optical element 201. Herein, it is required that the transparent plates, the first and second polarized light separating plates, and the liquid should be substantially equal in refractive index. This structure allows a reduction in cost and a reduction in weight of the polarized light separating optical element 201.

In this polarized light illumination apparatus 3, as described earlier with reference to the first embodiment 1, the small lenses of the condensing lens plate 411 of the condensing lens unit 401 are constructed in a decentered fashion so that the condensing lens plate 411 also serves as a superimposing lens thereby making it unnecessary to dispose a separate superimposing lens. This structure allows a reduction in cost and a reduction in weight of the polarized light illumination apparatus.

[Fourth Embodiment]

In the polarized light illumination apparatus 4 shown in FIG. 10, although the respective optical systems are disposed in a similar manner as in the first embodiment 1, the polarized light separating optical element 201 is constructed in the form of a flat plate. More specifically, two polarized light separating plates 261 (strictly speaking, there are three polarized light separating plates 261 because one polarized light separating plate is separated by the other polarized light separating plate) each consisting of a polarization separating film 262 disposed between two glass substrates 263 are disposed at an angle α=45° to the optical axes (L1, L2) of the system thereby achieving substantially the same functions as achieved by the polarized light separating optical element 201 formed in a hexahedral shape (refer to FIG. 1). This structure allows a reduction in cost and a reduction in weight of the polarized light separating optical element 201. In the present embodiment, unlike the first to third embodiments, the polarized light separating optical element 201 does not actually have first to sixth surfaces, however, the polarized light separating optical element 201 has first to sixth virtual surfaces as represented by broken lines in FIG. 10. The first and second light sources 101 and 102, the first to third λ/4 phase plates 351, 352, and 353, the first and second condensing mirrors 301 and 302, the reflecting mirror element 309, the condensing lens unit 401, and other elements are disposed at locations with respect to the first and sixth virtual surfaces in a similar manner as in the first to third embodiments.

[Fifth Embodiment]

Figure 11:
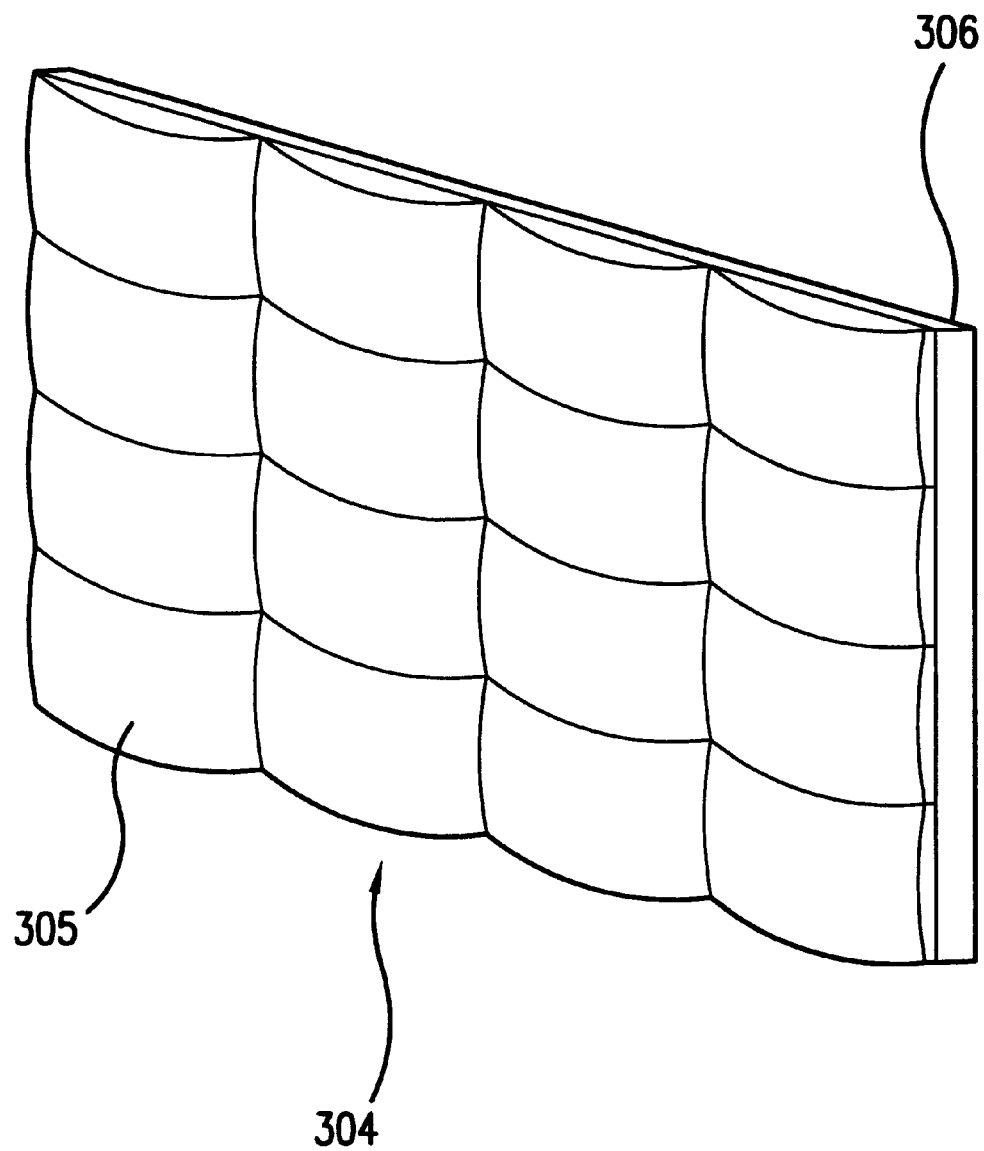
FIG. 11 is a perspective view of a condensing mirror plate according to a fifth embodiment, which can be employed in a polarized light illumination apparatus according to any of first to fourth embodiments.

In the polarized light illumination apparatuses 1 to 4 described above, one of or both of the first and second condensing mirror plates 301 and 302 may be formed in the shape of a condensing mirror plate 304 shown in FIG. 11. Herein the condensing mirror plate 304 includes a plurality of small lenses 305 and a reflecting mirror plate 306.

Furthermore, if each small lens 305 is formed in a decentered fashion such that the lights emerging from the respective small lenses 305 are directed toward the illumination area 601, then the first and second condensing mirror plates 301 and 302 also provide a superimposing function similar to that of the superimposing lens 431. In this case, the superimposing lens 431 becomes unnecessary, and thus the polarized light illumination apparatus can be produced at lower cost.

[Sixth Embodiment]

Figure 12:
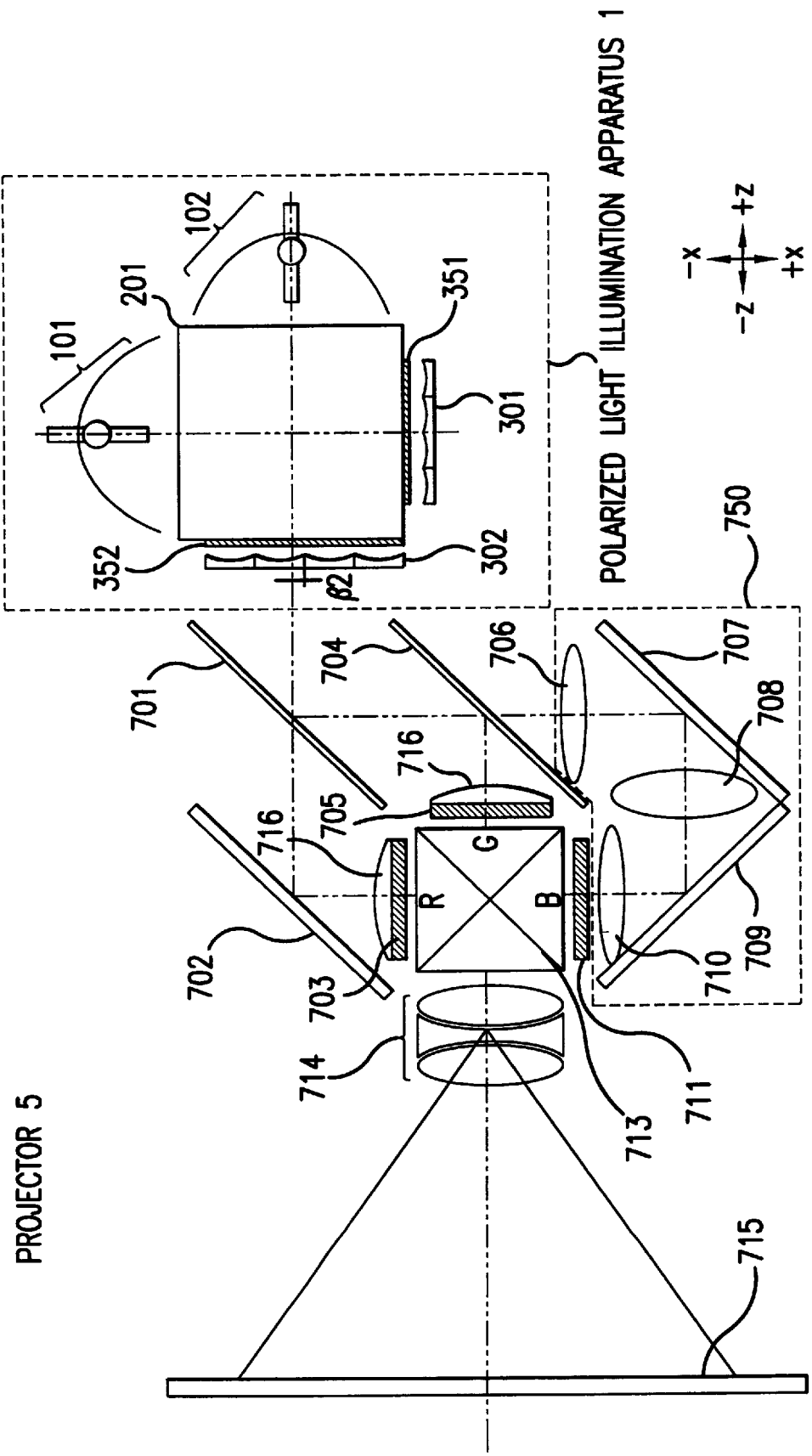
FIG. 12 is a cross-sectional view, taken in an xz-plane, of an optical system of a projector including the polarized light illumination optical system shown in FIG. 1 or 3.
Figure 13:
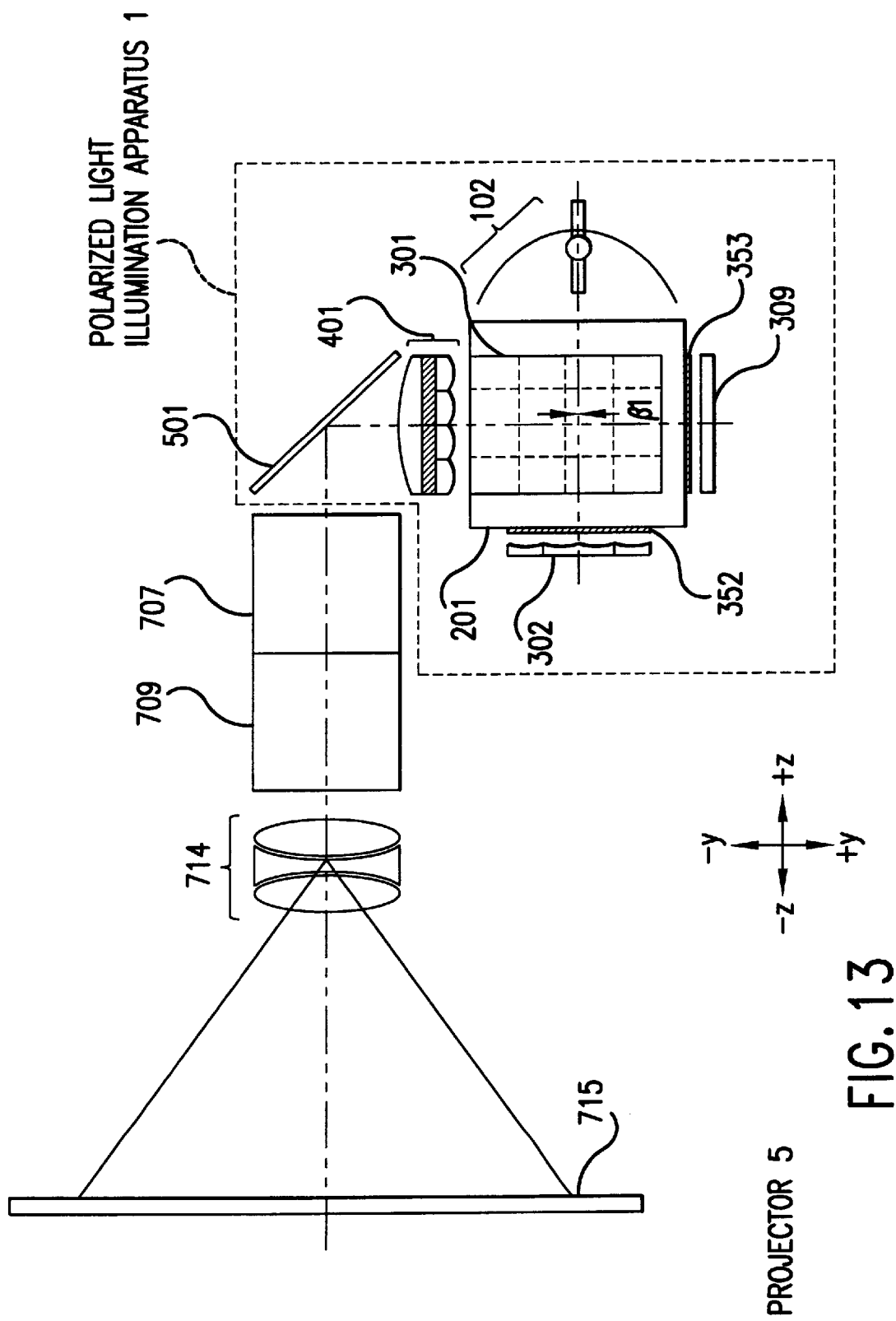
FIG. 13 is a cross-sectional view, taken in a yz-plane, of the optical system of the projector shown in FIG. 12.

Of polarized light illumination apparatuses disclosed in the first to fifth embodiments, the polarized light illumination apparatus 1 according to the first embodiment is employed herein in this sixth embodiment, by way of example, to construct a projector having improved capability of forming a projected image with higher brightness, as shown in FIGS. 12 and 13. In this projector 5 of the present embodiment, a transmissive liquid crystal light valve is employed as an optical modulator, and two different types of light source lamps with different emission spectra are used in the two light sources of the polarized light illumination apparatus 1 wherein these light source lamps can be selectively turned on. FIG. 12 is a cross-sectional view of the projector 5 taken along the xz plane, and FIG. 13 is a cross-sectional view of the projector 5 taken along the yz plane. Although the apparatus includes a condensing lens unit 401 and a reflecting mirror 501 serving as an optical path changing optical element, they are not shown in FIG. 12.

Referring to FIGS. 12 and 13, the polarized light illumination apparatus 1 disposed in the projector 5 of the present embodiment includes a first light source 101 and a second light source 102 for emitting randomly polarized lights in a single direction. The randomly polarized lights emitted from these light sources are separated by a polarized light separating optical element 201 into two types of polarized light. Of the two types of polarized light, a z-polarized light is converted by a λ/2 phase plate 421 of a condensing lens unit 401 into an x-polarized light. Thus, the light whose polarization is aligned into the same single direction (x direction) emerges from the condensing lens unit. The polarized light emerging from the condensing lens is reflected by a reflecting mirror 501 and directed in the −z direction. Thus, the polarized light is incident on a blue/green color reflecting dichroic mirror 701.

When the illumination light emitted from the polarized light illumination apparatus 1 is incident on the blue/green light reflecting dichroic mirror 701 (colored-light separating optical element), a red light component passes through the dichroic mirror 701, however, blue and green light components are reflected. The red light is then reflected by a reflecting mirror 702 and directed to a first liquid crystal light valve 703 via a collimator lens 716. Although not shown in FIG. 12, polarizers are disposed on the incident and emitting sides of the liquid crystal light valve. Of the blue and green light components, the green light component is reflected by a green light reflecting dichroic mirror 704 (colored-light separating optical element) and directed to a second liquid crystal light valve 705 via a collimator lens 716. The collimator lenses 716 disposed on the incident sides of the first and second liquid crystal light valves 703 and 705 prevent the light striking the liquid crystal valves from diverging thereby achieving an improved illumination efficiency. The collimator lenses 716 also serve to effectively direct the light emerging from the liquid crystal light valves to a projection lens. On the incident side of a third liquid crystal light valve 711, there is provided an emitting-side lens 710 forming a light guiding system 750, as will be described in detail later. The emitting-side lens 710 also provides a function similar to that of the collimator lenses 716. However, these collimator lenses 716 may be removed.

The blue light has a long optical path compared with the other two colored lights, and the light guiding system 750 realized with a relay lens system including an incident-side lens 706, a relay lens 708, and an emitting-side lens 710 is disposed in the optical path. That is, the blue light passes through the green light reflecting dichroic mirror 704 and is directed to the relay lens 708 via the incident-side lens 706 and the reflecting mirror 707. The blue light is focused by the relay lens 708 and then reflected by the reflecting mirror 709 toward the emitting-side lens 710. Thus, the blue light reaches the third liquid crystal light valve 711.

The first to third liquid crystal light valves 703, 705, and 711 modulate the respective colored lights so as to give image information associated with the respective colors to the corresponding colored lights. The modulated colored lights are incident on the cross-dichroic prism 713 (colored-light combining optical element). The cross-dichroic prism 713 includes a red light reflecting dielectric multilayer film and a blue light reflecting dielectric multilayer film which are both disposed inside the cross-dichroic prism 713 and which intersect each other in the shape of a cross. The cross-dichroic prism 713 synthesizes the modulated colored lights into a single light. The resultant synthesized light is projected onto a screen 715 via a projection lens 714 (projection optical system) thereby forming an image on the screen 715.

The liquid crystal light valves employed in this projector 5 each serve to modulate one type of polarized light. Therefore, if a conventional illumination apparatus is used to illuminate the liquid crystal light valves with randomly polarized light, then one-half or a greater part (typically 60%) of the randomly polarized light will be absorbed by the polarizers and converted to heat. Thus, the efficiency in use of light is low and a large-size cooling system, which often generates large noise, is required to remove the heat from the polarizers. Such problems are solved in the projector 5 of the present embodiment.

More specifically, in the projector 5 of the present embodiment, the light emitted from the polarized light illumination apparatus 1 is aligned in terms of polarization in the same single direction by rotating the polarization axis of only a component polarized in a particular direction (for example in the z direction) via a λ/2 phase plate 421 thereby conversion the state of polarization of that component into the same state of polarization as that of the remaining component (polarized for example in the x direction) whereby the first to third liquid crystal light valves 703, 705, and 711 are all illuminated with the light polarized in the same single direction. As a result, the efficiency in use of light is improved and a bright image can be projected. Furthermore, because the absorption of light by the polarizers decreases, the temperature increase of the polarizers is suppressed. This allows a small-sized cooling system which generates low noise to be employed. Furthermore, using two light sources including the first and second light sources 101 and 102, light whose polarization is aligned into the same single direction is emitted without causing a loss for any light emitted from the first and second light sources 101 and 102, thereby ensuring that a bright image can be projected. Still furthermore, in the polarized light illumination apparatus 1, because the polarization separating films are formed using a dielectric multilayer film which is thermally stable, the polarized light separating optical element 201 has thermally stable polarized light separation performance. As a result, when the polarized light illumination apparatus 1 is used in the projector 5 which requires a high optical output, stable polarized light separation performance can be achieved.

Furthermore, even though two light sources 101 and 102 are used, the illumination lights emitted from the two light sources 101 and 102 can be synthesized into a single light without causing an increase in the incident angle (illumination angle) of the illumination light to the illumination area. This means that the illumination light has the same cross section as obtained using only one light source. Thus, the amount of light per unit area can be increased to a level approximately two times greater than that obtained with a single light source. This makes it possible to project an image with greater brightness.

Furthermore, in the polarized light illumination apparatus 1, the two types of polarized light emerging from the polarized light separating optical element 201 are separated in the horizontal direction to fit the illumination areas or the displaying areas longer in the horizontal direction than in the vertical direction of the liquid crystal light valves so that the illumination areas having rectangular shapes longer in the horizontal direction than in the vertical direction are illuminated in a highly efficient fashion without wasting light. Thus, the polarized light illumination apparatus 1 is suitable to be coupled with a liquid crystal light valve with a shape longer in the horizontal direction than in the vertical direction to project a beautiful image with outstanding quality.

Furthermore, in the present embodiment, the cross-dichroic prism 713 employed as the colored-light synthesizing optical element allows a size reduction and also reductions in the optical paths between the projection lens 714 and the respective liquid crystal light valves 703, 705, and 711. This makes it possible to obtain a bright projected image using a projection lens with a rather small diameter. Of the three optical paths associated with the respective colored lights, one optical path is different in length from the other two optical paths. In the present embodiment, in the optical path for the blue light having the greatest length, there is provided the light guiding means 750 realized with the relay lens system including the incident-side lens 706, the relay lens 708, and the emitting-side lens 710 so as to prevent problems such as a color variation.

Furthermore, in the present embodiment, the reflecting mirror 501 serving as the optical path changing optical element is disposed between the condensing lens unit 401 serving as the polarization conversion optical element and the blue/green light reflecting dichroic mirror 701, whereby the traveling direction of the polarized light emerging from the polarization conversion optical element is changed. This allows the plane in which the colored-light separating optical element, the colored-light synthesizing optical element, the optical modulator, and the projection optical system are located and the plane in which the polarized light illumination apparatus 1 including two light sources having rather large sizes is located to be parallel to each other. Thus, it becomes possible to realize a thin projector having a small size in one direction.

In the polarized light illumination apparatus 1 disposed in the projector 5 according to the present embodiment, one of the first and second light sources 101 and 102 may be formed to be detachable. This allows a user to easily carry the projector 5 after removing one of the light sources.

In the polarized light illumination apparatus 1 in the projector 5 of the present embodiment, two types of light source lamps different in emission spectrum or brightness characteristics are used in the respective light sources 101 and 102, and these light source lamps can be selectively turned on. This brings about the following features and advantages.

Figure 14A:
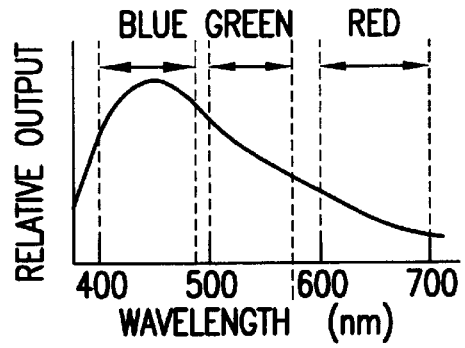
FIGS. 14(A)–(C) illustrate the emission spectra of light sources of the polarized light illumination apparatus.
Figure 14B:
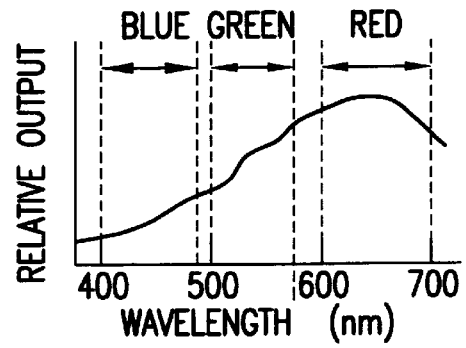
Figure 14C:
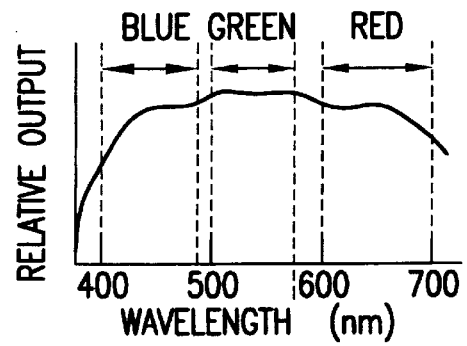

1) By combining two types of light source lamps having a different emission spectrum, it becomes possible to realize an ideal illumination apparatus or an illumination apparatus ideal for use in a projector. More specifically, light source lamps used in projector are required to provide a large optical output over the entire wavelength range including wavelengths of blue, green, and red. Furthermore, the optical output is required to be well balanced among blue, green, and red. However, at present, such an ideal light source lamp is not available. FIGS. 14(A)–(C) illustrate the spectra of light emitted from light source lamps and a polarized light illumination apparatus. For example, a lamp (such as a high-pressure mercury lamp) having a relatively high luminous efficiency but having a relatively low intensity at a wavelength corresponding to red as shown in FIG. 14(A) is widely used. Another widely used lamp (such as a certain type of metal halide lamp) has, as shown in FIG. 14(B), a relatively high luminous intensity for red but has a relatively low luminous efficiency. If two types of light source lamps having emission spectra shown in FIGS. 14(A) and 14(B), respectively, are employed in the polarized light illumination apparatus 1 of the projector 5 and if both lamps are turned on during the operation, then the resultant light emitted from the polarized light illumination apparatus 1 has an ideal spectrum as shown in FIG. 14(C). This makes it possible to easily realize a projector capable of projecting a high-quality image with a high brightness.

2) By selectively turning on the two types of light source lamps having different emission spectra, the color tone of the projected image can be changed in accordance with preferences of a user.

3) By selectively turning on the two type of light source lamps, it is possible to change the brightness of the projected image depending on the environment in which the projector is used or depending on preferences of the user. More specifically, when the projector is used in a light environment, both light sources may be turned on, whereas only one of the light sources may be turned on when it is used in a dark environment.

4) If the two light source lamps are alternately used, the life of each light source lamp becomes longer. Furthermore, when one of the light source lamps becomes unusable because of a failure or expiration of life, it is possible to continue to form a projected image using the remaining light source lamp. Thus, operability is improved. Furthermore, when the projector is driven by a battery, only one of the light sources may be selectively used thereby making it possible to increase the battery life.

Although the polarized light illumination apparatus 1 is employed, by way of example, in the present embodiment, any of the polarized light illumination apparatuses 2 to 4 may also be employed.

[Seventh Embodiment]

The polarized light illumination apparatus according to the present invention may also be used in a projector using a reflective liquid crystal light valve as an optical modulator.

Figure 15:
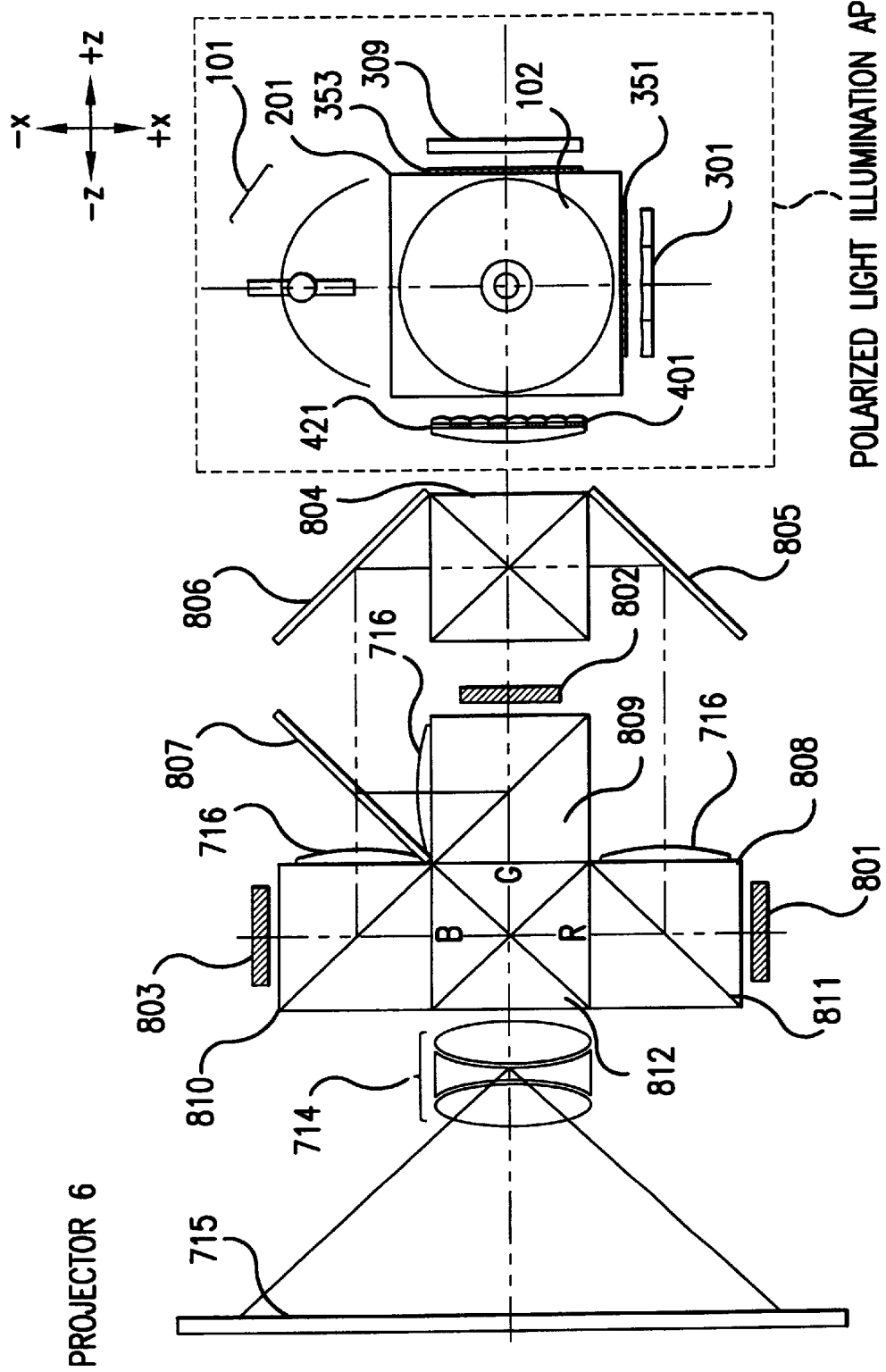
FIG. 15 is a cross-sectional view, taken in an xz-plane, of another example of an optical system used in a projector including the polarized light illumination optical system shown in FIG. 1 or 3.

FIG. 15 illustrates a projector 6 (in cross section taken along the xz plane) in which a polarized light illumination apparatus 1' which is a modification of the polarized light illumination apparatus 1 described in the first embodiment is employed. In the polarized light illumination apparatus 1 according to the first embodiment, the phase layer 422 of the λ/2 phase plate 421 is formed at locations corresponding to the secondary light source images C1 (refer to FIG. 7), and the polarized light illumination apparatus 1 includes the reflecting mirror 501. However, in the polarized light illumination apparatus 1' of the present embodiment, the phase layer 422 is formed at locations corresponding to the secondary light source images C2 (refer to FIG. 7), and the reflecting mirror 501 is removed. The randomly polarized lights emitted from the first and second light sources 101 and 102 are respectively separated by the polarized light separating optical element 201 into two different types of polarized light. Of the separated polarized lights, x-polarized lights are converted by the λ/2 phase plate (not shown) of the condensing lens unit (not shown) to z-polarized light with which reflective liquid crystal light valves 801, 802, and 803 disposed at three different locations are illuminated.

The light emitted from the polarized light illumination apparatus 1' is first separated into a red light and blue/green lights via a colored-light separation cross-dichroic prism 804 (colored-light separation optical element) including a blue/green light reflecting dielectric multilayer film and a red light reflecting dielectric multilayer film which are disposed in the form of a cross. The red light is incident on a first polarized beam splitter 808 via a reflecting mirror 805 and a collimator lens 716. On the other hand, the blue/green lights are reflected by a reflecting mirror 806 and then separated into green light (reflected light) and a blue light (transmitted light) by a green light reflecting dichroic mirror 807 (colored-light separation optical element). The respective colored lights are incident on second and third polarized beam splitters 809 and 810, respectively, via a collimator lens 716. The polarized beam splitters 808, 809, and 810 (polarized light separating optical elements) disposed at three different locations each include a polarized light separation plane 811 which transmits a P-polarized component and reflects an S-polarized component of incident light thereby separating the incident light into P- and S-polarized lights. In FIG. 15, almost all of the light emitted from the polarized light illumination apparatus 1' is polarized in the y direction which corresponds to the S-polarized direction. On the other hand, the P-polarized light corresponds to the x-polarized or z-polarized light.

Because almost all of the light emitted from the polarized light illumination apparatus 1' is S-polarized, almost all of colored lights incident on the first to third polarized light beam splitters 808, 809, and 810 are reflected by the polarized light separating plane 811 and the traveling directions thereof are changed by substantially 90°. The resultant lights are then incident on adjacent first to third reflective liquid crystal light valves 801, 802, and 803, respectively.

However, there is a possibility that the colored lights incident on the first to third polarized beam splitters 808, 809, and 810 include a small amount of light polarized in a direction (for example P-polarized direction) other than the S-polarized direction. Such a light polarized in a different direction passes through the polarized light separating plane 811 and emerges from the polarized beam splitters without being changed in the traveling direction. Thus, such a light does not contribute to illuminating the reflective liquid crystal light valves. The collimator lenses 716 disposed on the incident sides of the respective polarized beam splitters work in a similar manner as the collimator lenses 716 employed in the projector 5 according to the sixth embodiment. Therefore, these collimator lenses 716 may be disposed between the polarized beam splitters and the corresponding reflective liquid crystal light valves. However, the collimator lenses 716 may be removed, if desired.

The lights (S-polarized lights) incident on the reflective liquid crystal light valves are modulated by the respective liquid crystal light valves in accordance with image information supplied from the outside. More specifically, when the lights pass through the reflective liquid crystal light valves, the polarization directions of the respective lights are changed in accordance with image information and the traveling directions thereof are substantially reversed. The lights emerging from the reflective liquid crystal light valves are again incident on the polarized beam splitter. At this time, because the lights emerging from the respective liquid crystal light valves are partially P-polarized depending on the image information, only P-polarized components pass through the polarized beam splitters depending on the polarization selectivity of the polarized beam splitters (thus an image corresponding to the image information is formed). The transmitted lights are directed to the colored-light synthesizing cross-dichroic prism 812. The colored lights incident on the colored-light synthesizing cross-dichroic prism 812 (colored-light combining optical element) are combined into a single optical image and projected onto a screen 715 via a projection lens 714 (projection optical system) thereby forming a color image thereon.

Also in this projector 6 using reflective liquid crystal light valves, the reflective liquid crystal light valves modulate only one type of polarized light. Therefore, if the reflective liquid crystal light valves are illuminated with randomly polarized light emitted from a conventional illumination apparatus, then one-half or a greater part (typically 60%) of the randomly polarized light will be absorbed by the polarizers and converted to heat. Thus, the efficiency in use of light is low and a large-size cooling system, which often generates large noise, is required to remove the heat from the polarizers. Such problems are solved in the projector 6 of the present embodiment.

More specifically, in the projector 6 of the present embodiment, the light emitted from the polarized light illumination apparatus 1' is aligned in terms of polarization in the same single direction by rotating the polarization axis of only a component polarized in a particular direction (for example in the x direction) via a λ/2 phase plate thereby conversion the state of polarization of that component into the same state of polarization as that of the remaining component (polarized for example in the z direction) whereby the first to third liquid crystal light valves 801, 802, and 803 are all illuminated with the light polarized in the same single direction. As a result, the efficiency in use of light is improved and a bright image can be projected. Furthermore, because the absorption of light by the polarizers decreases, the temperature increase of the polarizers is suppressed. This allows a small-sized cooling system which generates low noise to be employed. Furthermore, using two light sources including the first and second light sources 101 and 102, a light whose polarization is aligned into the same single direction is emitted without causing a loss for any light emitted from the first and second light sources 101 and 102, thereby ensuring that a bright image can be projected. Still furthermore, in the polarized light illumination apparatus 1', because the polarization separating film is formed using a dielectric multilayer film which is thermally stable, the polarized light separating optical element 201 has thermally stable polarized light separation performance. As a result, when the polarized light illumination apparatus 1' is used in the projector 6 which requires a high optical output, stable polarized light separation performance can be achieved.

Furthermore, even though two light sources 101 and 102 are used, the illumination lights emitted from the two light sources 101 and 102 can be combined into a single light without causing an increase in the incident angle (illumination angle) of the illumination light to the illumination area. This means that the illumination light has the same cross section as obtained using only one light source. Thus, the amount of light per unit area can be increased to a level approximately two times greater than that obtained with a single light source. This makes it possible to project an image with greater brightness.

Also in the projector 6 of the present embodiment, one of the first and second light sources 101 and 102 may be formed to be detachable. Furthermore, two types of light source lamps having different emission spectra or different brightness characteristics may be employed in the first and second light sources 101 and 102. The two light source lamps may be selectively turned on thereby achieving similar advantages as described above.

Polarizers may be disposed on the incident sides of the respective polarized beam splitters 808, 809, and 810, and on the emitting sides of the respective polarized beam splitters 808, 809, and 810 or on the emitting side of the colored-light synthesizing cross-dichroic prism thereby increasing the contrast of the displayed image.

In the art of projector using a reflective light valve as is the case with the present embodiment, it is known to realize a color separating and synthesizing optical system using a combination of one polarized beam splitter and one color separating and synthesizing prism. In this case, the polarized light emitted from the polarized light illumination apparatus is directed to the color separating and synthesizing prism via the polarized beam splitter and the color separating and synthesizing prism separates the received polarized light into different colored lights, which are supplied to the reflective light valves. The reflective light valves modulate the respective lights. The resultant lights are again incident on the color separating and synthesizing prism to combine the lights into a single light which is then projected via the polarized beam splitter.

Of course, any of the polarized light illumination apparatuses 2 to 4 may also be employed instead of the polarized light illumination apparatus 1.

[Other Embodiments]

In the case of a projector using transmissive liquid crystal light valves, a colored-light synthesizing optical element formed of two dichroic mirrors, that is, a so-called mirror optical system, may also be employed instead of the cross-dichroic prism 713 employed in the projector 5 according to the sixth embodiment. In this case, the polarized light illumination apparatus according to the present invention is also applicable. In the case where the mirror optical system is employed, it is possible to construct the projector such that the optical paths between the polarized light illumination apparatus and the respective liquid crystal light valves disposed at three different locations are equal to one another. This makes it possible to provide illumination with small variations in brightness and color tone without having to use the light guiding means 750 such as that employed in the first embodiment.

In the first to sixth embodiments described above, the condensing lens unit 401 converts the z-polarized light to x-polarized light thereby obtaining an illumination light polarized in the x direction. Instead, as described in the seventh embodiment, the x-polarized light may be converted to z-polarized light thereby obtaining an illumination light polarized in the z direction. In this case, the phase layer 422 of the $\lambda/2$ phase plate 421 is disposed at locations where the secondary light source images of the x-polarized lights are formed. The alignment of polarization may also be accomplished by rotating the polarization for both z- and x-polarized lights. In this case, the phase layer is disposed at locations where the secondary light source images of both z- and x-polarized lights are formed.

In the embodiments described above, the $\lambda/2$ phase plate and the $\lambda/4$ phase plate are assumed to be formed of a widely used high-polymer film. Alternatively, these phase plates may be formed of a twisted nematic (TN) liquid crystal. In the case where a TN liquid crystal is employed to form the phase plates, it is possible to reduce dependence upon wavelength. As a result, the $\lambda/2$ phase plate and the $\lambda/4$ phase plates have higher polarization conversion performance than can be obtained using a widely used high-polymer film. The polarized light illumination apparatus disclosed above with reference to specific embodiments are particularly useful when it is used in a projector including a light valve such as a liquid crystal light valve which works on light polarized in a particular direction. However, when it is applied to a projector including a light valve such as DMD (trademark of Texas Instruments Inc., USA) whose operation is not based on particular polarization of light, the polarized light illumination apparatus according to the present invention can also provide similar features and advantages as described above.

What is claimed is:

1. A polarized light illumination apparatus comprising:
    a polarized light separating optical element including: a) a first polarization separating film that separates light incident from a first direction into two types of polarized light, transmits one of the two types of polarized light and directs the transmitted one type of polarized light in a third direction, and reflects another of the two types of polarized light and directs the reflected other type of polarized light in a fourth direction, and b) a second polarization separating film that separates light incident from a second direction into two types of polarized lights, reflects one of the two types of polarized lights and directs the reflected one type of polarized light in said fourth direction, and transmits another of the two types of polarized lights and directs the transmitted other type of polarized light in a fifth direction;
    a first light source that emits the light incident on said polarized light separating optical element from said first direction;
    a second light source that emits the light incident on said polarized light separating optical element from said second direction;

a first condensing and reflecting optical element including a plurality of small condensing and reflecting elements, that substantially reverses a traveling direction of the light emerging in said third direction form said polarized light separating optical element and forms a plurality of condensed light images;

a second condensing and reflecting optical element including a plurality of small condensing and reflecting elements that substantially reverses a traveling direction of the light emerging in said fifth direction from said polarized light separating optical element and forms a plurality of condensed light images;

a reflecting optical element that substantially reverses a traveling direction of the light emerging in said fourth direction form said polarized light separating optical element;

a first polarization-state conversion optical element disposed between said polarized light separating optical element and said first condensing and reflecting optical element;

a second polarization-state conversion optical element disposed between said polarized light separating optical element and said second condensing and reflecting optical element;

a third polarization-state conversion optical elements disposed between said polarized light separating optical element and said reflecting optical elements; and a polarization conversion optical elements that makes uniform direction of polarization of the light emerging from said polarized light separating optical element in a sixth direction, a center axis of the light which is incident on said polarization conversion optical elements after being reflected by said small condensing and reflecting elements of said first condensing and reflecting optical element and a center axis of the light which is incident on said polarization conversion optical element after being reflected by said small condensing and reflecting elements of said second condensing and reflecting optical element being substantially parallel to each other and not overlapping each other, said reflecting optical element being disposed such that the light emitted from said first light source and then reflected by said first polarization separating film is incident on said second light source and the light emitted from said second light source and then reflected by said second polarization separating film is incident on said first light source.

2. The polarized light illumination apparatus according to claim 1, an opening of each small condensing and reflecting element being geometrically similar in shape to an area to be illuminated.

3. The polarized light illumination apparatus according to claim 1, further comprising a condensing optical element including a plurality of condensing elements that condenses the light emerging from said polarized light separating optical element disposed on one of an incident side and an emitting side of said polarization conversion optical element.

4. The polarized light illumination apparatus according to claim 1, further comprising a superimposing optical element that superimposes the lights emerging from said polarization conversion optical elements upon an area to be illuminated disposed on an emitting side of said polarization conversion optical element.

5. The polarized light illumination apparatus according to claim 1, further comprising an optical path changing optical element that changes an optical path of the light emerging from said polarization conversion optical elements disposed on an emitting side of said polarization optical element.

6. The polarized light illumination apparatus according to claim 1, said small condensing and reflecting elements of said first condensing and reflecting optical element and said second condensing and reflecting optical element each comprising a curved surface reflecting mirror.

7. The polarized light illumination apparatus according to claim 1, said small condensing and reflecting elements of said first condensing and reflecting optical element and said second condensing and reflecting optical element each comprising a lens and a reflecting surface formed on a surface of a lens opposite to said polarized light separating optical element.

8. A projector comprising:
the polarized light illumination apparatus according to claim 1;
an optical modulator that modulates light emitted from said polarized light illumination apparatus; and
a projecting optical system that projects the light modulated by said optical modulator.

9. A projector comprising:
the polarized light illumination apparatus according to claim 1;
a colored-light separating optical element that separates light emitted from said polarized light illumination apparatus into a plurality of colored lights;
a plurality of optical modulators that respectively modulate the colored lights separated by said colored-light separating optical element;
a colored-light synthesizing optical element that synthesizes the lights modulated by said plurality of optical modulators; and
a projecting optical system that projects the light synthesized by said colored-light synthesizing optical element.

10. A projector comprising:
the polarized light illumination apparatus according to claim 1;
a reflective optical modulator that modulates light emitted from said polarized light illumination apparatus;
a polarized beam splitter that separates a plurality of polarized light components contained in the light emitted from said polarized light illumination apparatus and in the light modulated by said reflective optical modulator from one another; and
a projecting optical system that projects the light modulated by said reflective optical modulator and then emitted via said polarized beam splitter.

11. A projector comprising:
the polarized light illumination apparatus according to claim 1;
a plurality of reflective optical modulators that modulate light emitted from said polarized light illumination apparatus;
a polarized beam splitter that separates a plurality of polarized light components contained in the light emitted from said polarized light illumination apparatus and in the light modulated by said plurality of reflective optical modulators from one another;
a colored-light separating and combining optical element disposed between said polarized beam splitter and said plurality of reflective optical modulators that separates the light emitted from said polarized light illumination apparatus into a plurality of colored lights and combines the colored lights emitted from said plurality of reflective optical modulators; and a projecting optical system that projects the light modulated by said plurality of reflective optical modulators and then emitted via said colored light separating and combining optical element and said polarized beam splitter.

12. A projector comprising:

the polarized light illumination apparatus according to claim 1;

a colored-light separating optical element that separates light emitted from said polarized light illumination apparatus into a plurality of colored lights;

a plurality of reflective optical modulators that respectively modulate the colored lights separated by said colored-light separating optical element;

a plurality of polarized beam splitters that separate a plurality of polarized light components contained in the colored lights separated by said colored-light separating optical element and in the colored lights modulated by said plurality of reflective optical modulators from one another;

a colored-light synthesizing optical element that synthesizes the lights modulated by said plurality of reflective optical modulators and then emitted via said plurality of polarized beam splitter; and a projecting optical system that projects the light synthesized by said colored-light synthesizing optical element.

13. The projector according to claim 9, at least one of the first light source and the second light source being detachable.

14. The projector according to claim 9, at least one of the first light source and the second light source being selectively turned on.

15. The projector according to claim 8, at least one of the first light source and the second light source being detachable.

16. The projector according to claim 8, at least one of the first light source and the second light source being selectively turned on.

17. The projector according to claim 10, at least one of the first light source and the second light source being detachable.

18. The projector according to claim 10, at least one of the first light source and the second light source being selectively turned on.

19. The projector according to claim 11, at least one of the first light source and the second light source being detachable.

20. The projector according to claim 11, at least one of the first light source and the second light source being selectively turned on.

21. The projector according to claim 12, at least one of the first light source and the second light source being detachable.

22. The projector according to claim 12, at least one of the first light source and the second light source being selectively turned on.

* * * * *